US011551835B2

(12) United States Patent
Lindsey et al.

(10) Patent No.: US 11,551,835 B2
(45) Date of Patent: Jan. 10, 2023

(54) TRANSMISSION LINE ASSEMBLY AND COMPACT INSULATOR AND HARDWARE ASSEMBLY FOR A TRANSMISSION LINE ASSEMBLY

(71) Applicant: LINDSEY MANUFACTURING COMPANY, Azusa, CA (US)

(72) Inventors: Keith E. Lindsey, La Canada, CA (US); Miguel A. Flores, Rosemead, CA (US)

(73) Assignee: Lindsey Manufacturing Company, Azusa, CA (US)

(*) Notice: Subject to any disclaimer, the term of this patent is extended or adjusted under 35 U.S.C. 154(b) by 110 days.

(21) Appl. No.: 17/133,353

(22) Filed: Dec. 23, 2020

(65) Prior Publication Data

US 2022/0044848 A1 Feb. 10, 2022

Related U.S. Application Data

(60) Provisional application No. 63/063,079, filed on Aug. 7, 2020.

(51) Int. Cl.
*H01B 17/40* (2006.01)
*H02G 7/20* (2006.01)
(Continued)

(52) U.S. Cl.
CPC ............ *H01B 17/40* (2013.01); *H01B 17/04* (2013.01); *H01B 17/08* (2013.01); *H01B 17/12* (2013.01); *H01B 17/14* (2013.01); *H01B 17/56* (2013.01)

(58) Field of Classification Search
CPC .......... H02G 7/14; H02G 7/20; H02G 7/056; H02G 7/125; H02G 7/12; H02G 1/12; H02G 7/02; H02G 7/05; H02G 7/053; H02G 7/205; H02G 7/00; F16L 3/1233; F16L 3/00; H01R 4/643; H01R 4/64; H01B 17/40; H01B 17/04; H01B 17/08; H01B 17/12; H01B 17/14; H01B 17/56
USPC ............ 174/40 R, 41, 42, 44, 45 R, 45 TD, 174/40 TD, 176, 137 R, 43; 248/200, 248/205.1; 52/651.02, 651.03, 40, 697
See application file for complete search history.

(56) References Cited

U.S. PATENT DOCUMENTS

| 3,002,043 A * | 9/1961 | Jenner ................ H02G 7/20 174/45 R |
| 4,458,102 A * | 7/1984 | White ................. H02G 7/20 174/45 R |

(Continued)

OTHER PUBLICATIONS

CIPO Office action dated Nov. 17, 2022 for Canadian Patent Application No. 3,127,209, 4 pages.

*Primary Examiner* — Angel R Estrada
(74) *Attorney, Agent, or Firm* — Lewis Roca Rothgerber Christie LLP

(57) ABSTRACT

A transmission line assembly and a compact insulator and hardware assembly for a transmission line assembly are provided. In an embodiment, a transmission line assembly includes a first V-string including a first post insulator and a second post insulator; a second V-string including a third post insulator and a fourth post insulator; and a suspension insulator, and a first yoke plate, a second yoke plate, and a third yoke plate are configured to respectively support a first phase conductor, a second phase conductor, and a third phase conductor to have an inverted triangular configuration.

18 Claims, 28 Drawing Sheets

(51) Int. Cl.
*H01B 17/08* (2006.01)
*H01B 17/14* (2006.01)
*H01B 17/04* (2006.01)
*H01B 17/12* (2006.01)
*H01B 17/56* (2006.01)

(56) References Cited

U.S. PATENT DOCUMENTS

| | | | | |
|---|---|---|---|---|
| 4,679,672 | A * | 7/1987 | Seddon | B60M 1/20 |
| | | | | 174/45 R |
| 8,952,251 | B2 * | 2/2015 | Fulk | H02G 7/20 |
| | | | | 174/45 TD |
| D853,594 | S * | 7/2019 | Momme | D25/127 |
| 10,476,249 | B2 * | 11/2019 | Lindsey | H02G 7/05 |
| 10,899,249 | B2 * | 1/2021 | Parsons | H01B 17/38 |

* cited by examiner

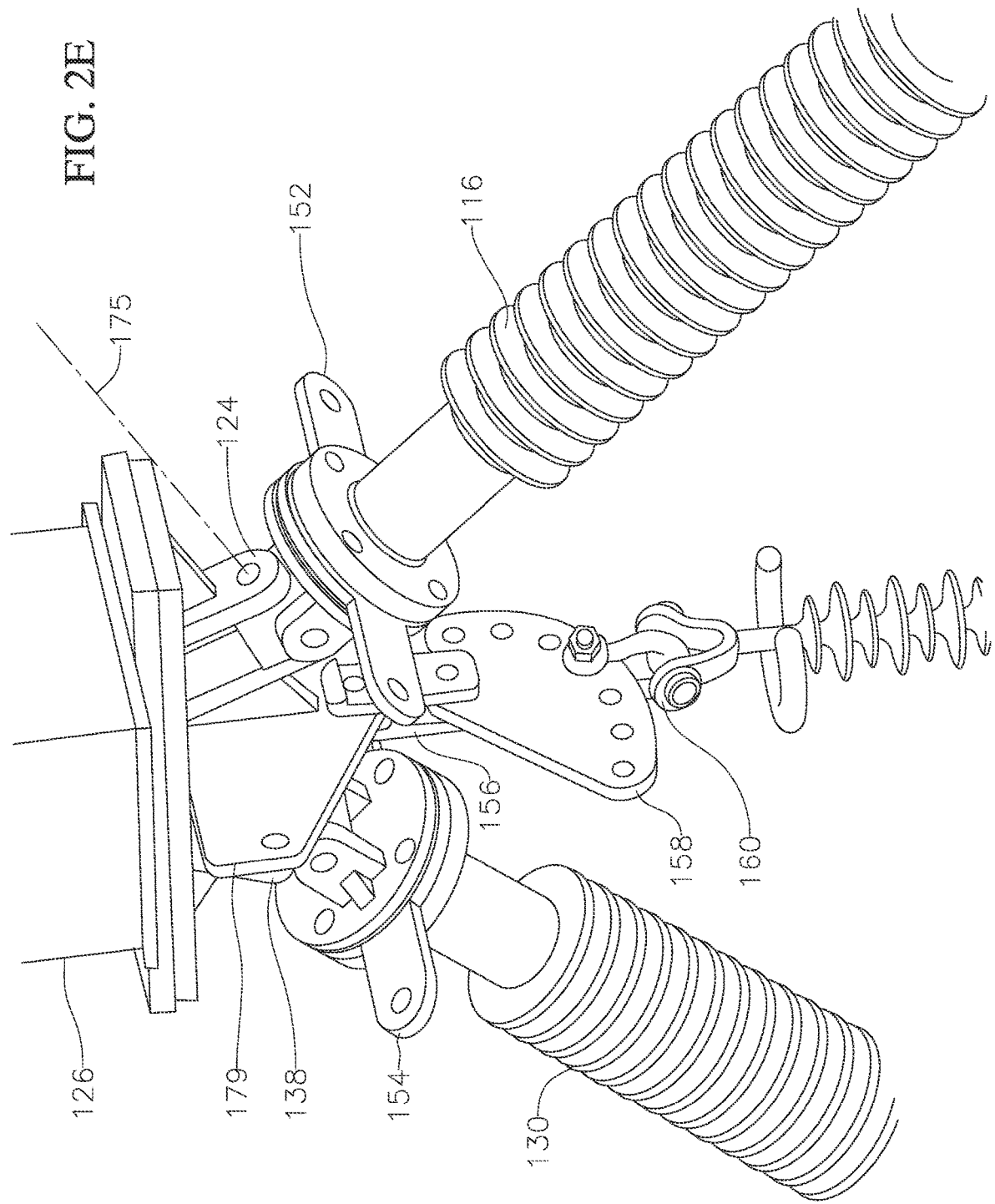

TRANSMISSION LINE ASSEMBLY AND COMPACT INSULATOR AND HARDWARE ASSEMBLY FOR A TRANSMISSION LINE ASSEMBLY

CROSS-REFERENCE TO RELATED APPLICATION

This application claims the benefit of U.S. Provisional Application No. 63/063,079, filed on Aug. 7, 2020, the entire content of which is incorporated by reference herein.

BACKGROUND

1. Field

Aspects of embodiments of the present invention relate to a transmission line post assembly and a circuit tower including the same.

2. Description of the Related Art

In recent years, the development of urban and industrial areas has led to increased power demands. Further, depending on the development plans, transmission lines may need to supply sufficient power while clearing narrow corridors. For example, in the case where an existing area is built up, the same power demands may be desired while reducing the horizontal clearance (i.e., right of way (ROW)) of a transmission line post assembly attached to a post of a circuit tower.

However, ROW is not the only consideration when providing a transmission line post assembly. A low profile may also be desirable to fit the dimensions of the corridor while reducing the likelihood of posing a health or safety hazard due to undesirable close proximity to facilities and/or people.

Additionally, the transmission line post assembly may be arranged such that susceptibility to wind, ice, and/or broken conductor loading is reduced. Failure to accommodate the high-tension conditions associated with imbalanced ice, wind, broken conductor loading may cause the transmission line post assembly to fail.

The above information disclosed in this Background section is for enhancement of understanding of the background of the present disclosure, and therefore, it may contain information that does not constitute prior art.

SUMMARY

Aspects of one or more example embodiments of the present disclosure are directed towards a transmission line post assembly which results in a reduced form factor. In other words, the transmission line post assembly may have a reduced ROW with a low profile.

Aspects of one or more example embodiments of the present disclosure are directed towards a transmission line post assembly having reduced susceptibility to wind, ice, and/or broken conductor loads.

Aspects of one or more example embodiments of the present disclosure are directed towards a transmission line post assembly and method of live-line maintenance.

BRIEF DESCRIPTION OF THE DRAWINGS

The above and other features and advantages will become more apparent to those of ordinary skill in the art by describing in detail some exemplary embodiments of the present disclosure with reference to the attached drawings, in which:

FIG. 2E is an enlarged perspective view of second ends of a second post insulator and a fourth post insulator, a second pivot member, a fourth pivot member, a cross arm extension, and a suspension insulator of FIG. 2A according to one or more embodiments of the present disclosure.

DETAILED DESCRIPTION

Figure 1A:
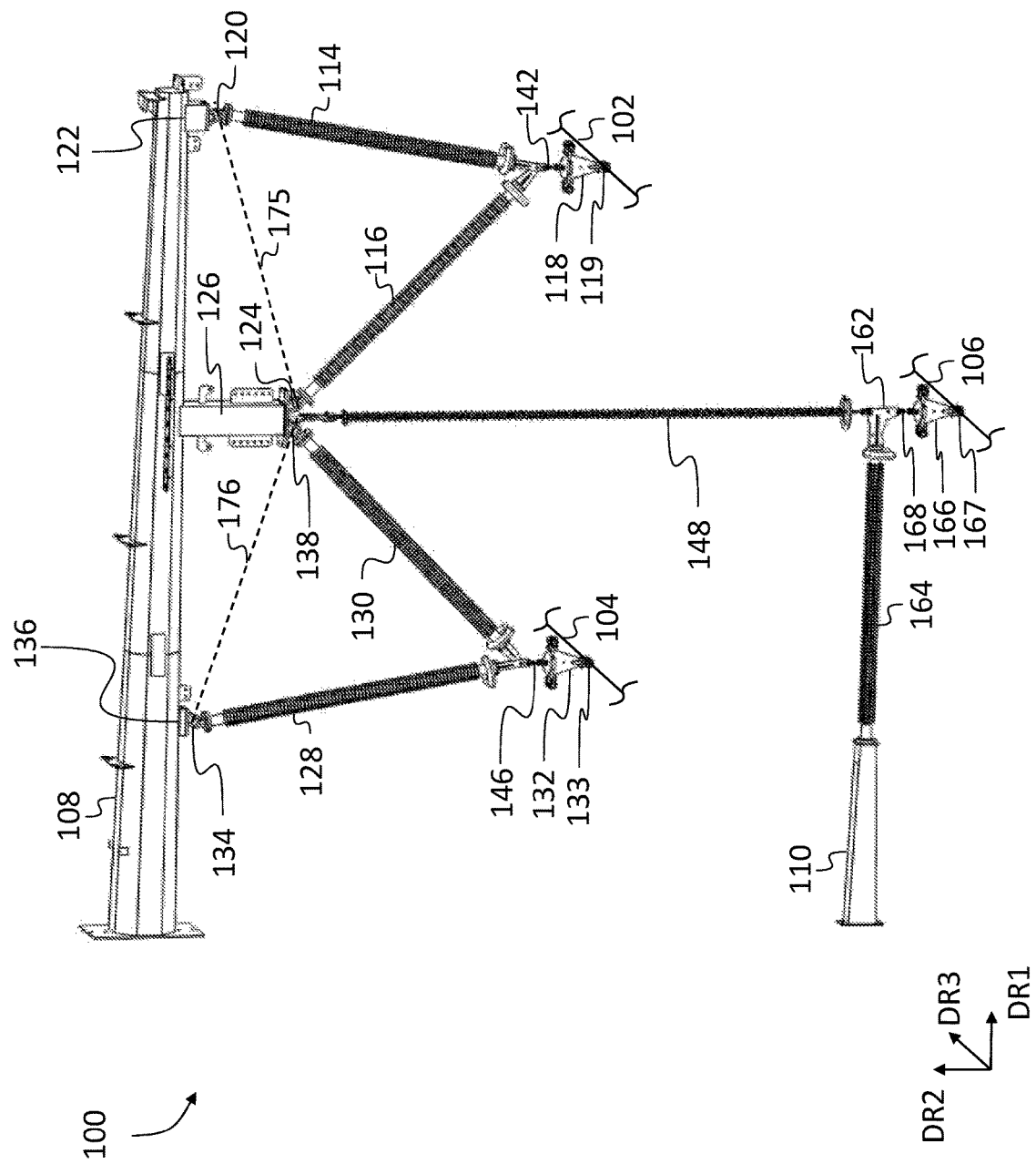
FIG. 1A is a front view of a transmission line post assembly according to one or more embodiments of the present disclosure.

Herein, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Figure 1B:
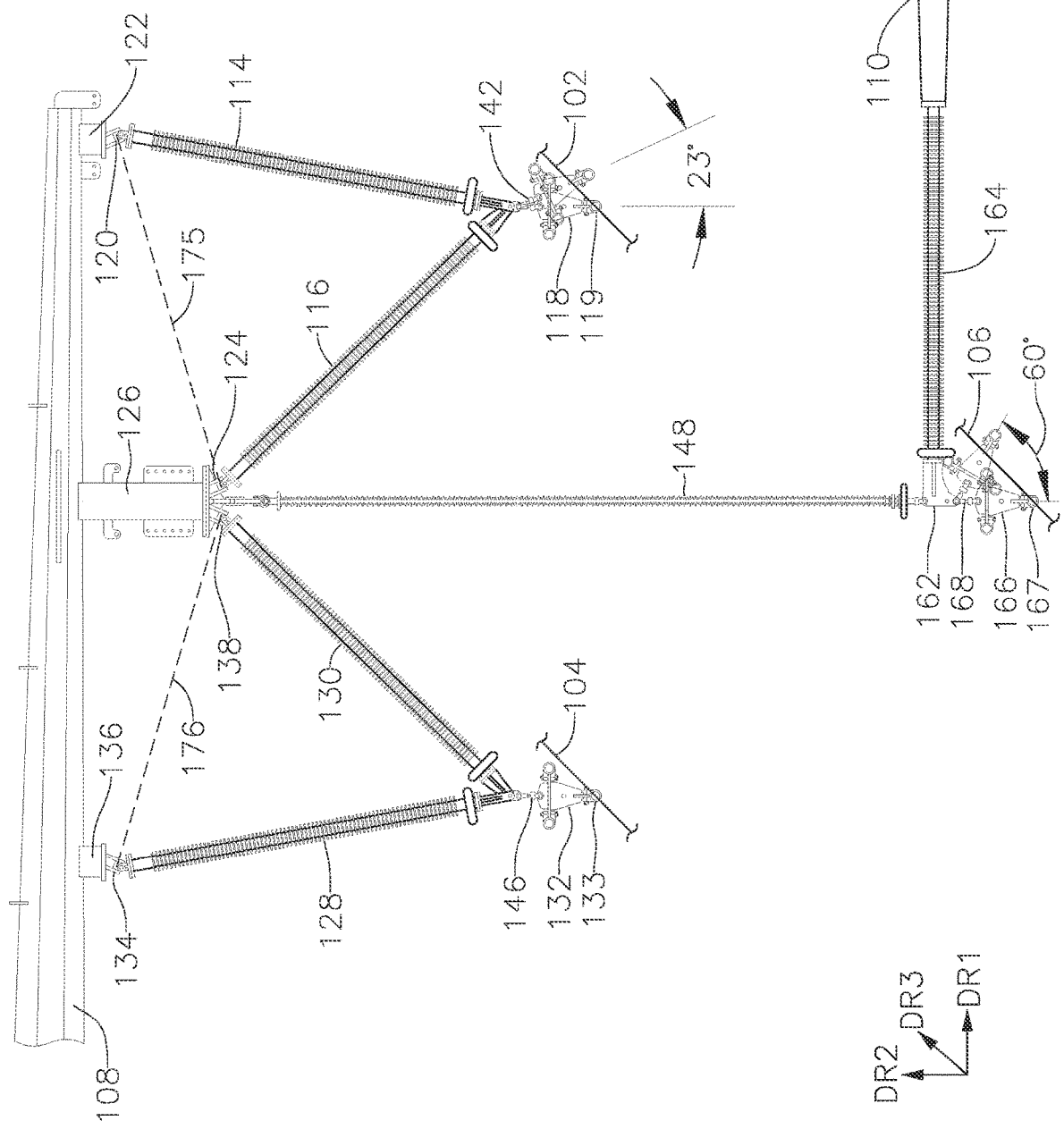
FIG. 1B is a schematic view of the transmission line post assembly of FIG. 1A according to one or more embodiments of the present disclosure.
Figure 2A:
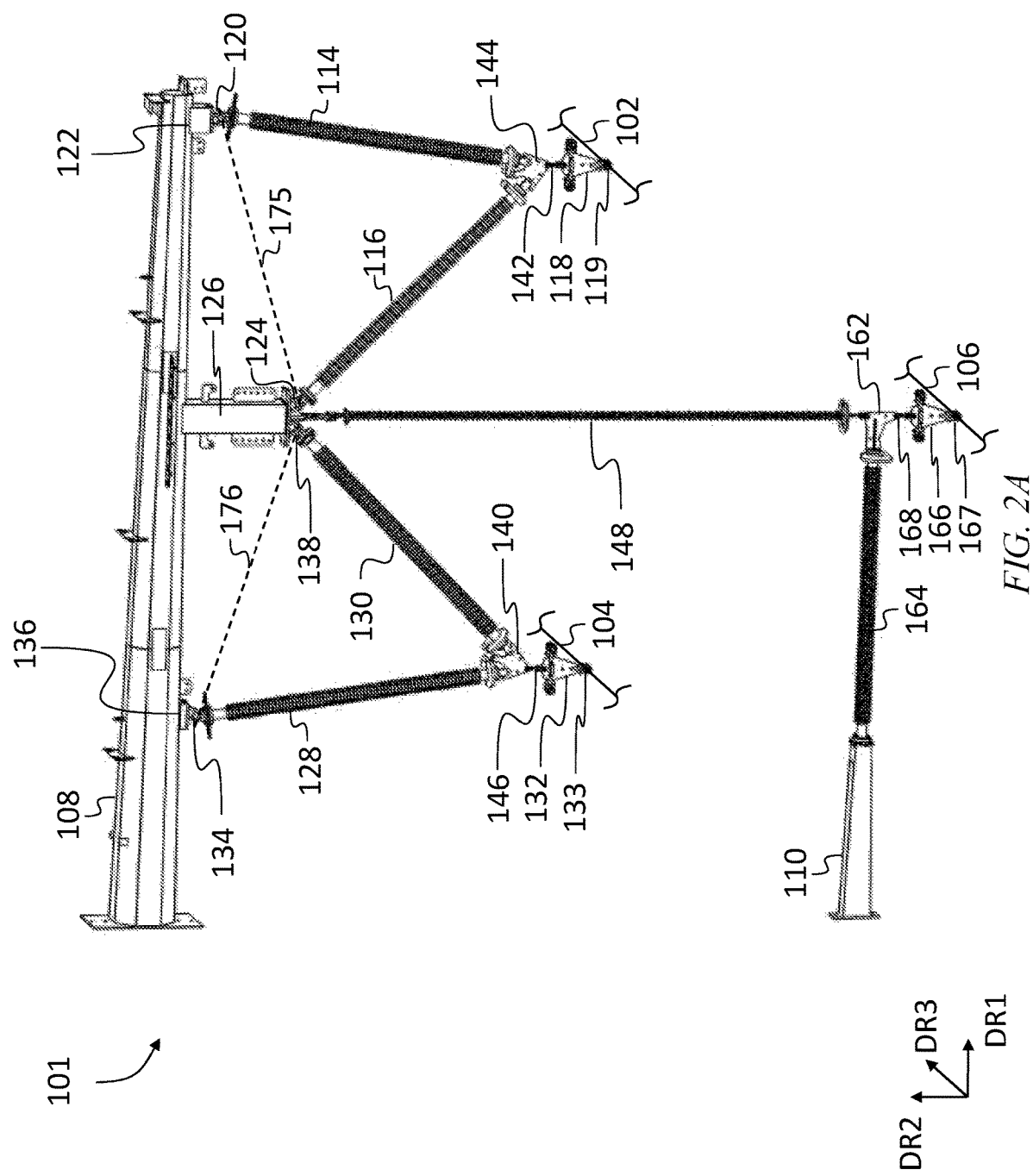
FIG. 2A is a front view of a transmission line post assembly according to one or more embodiments of the present disclosure.
Figure 2B:
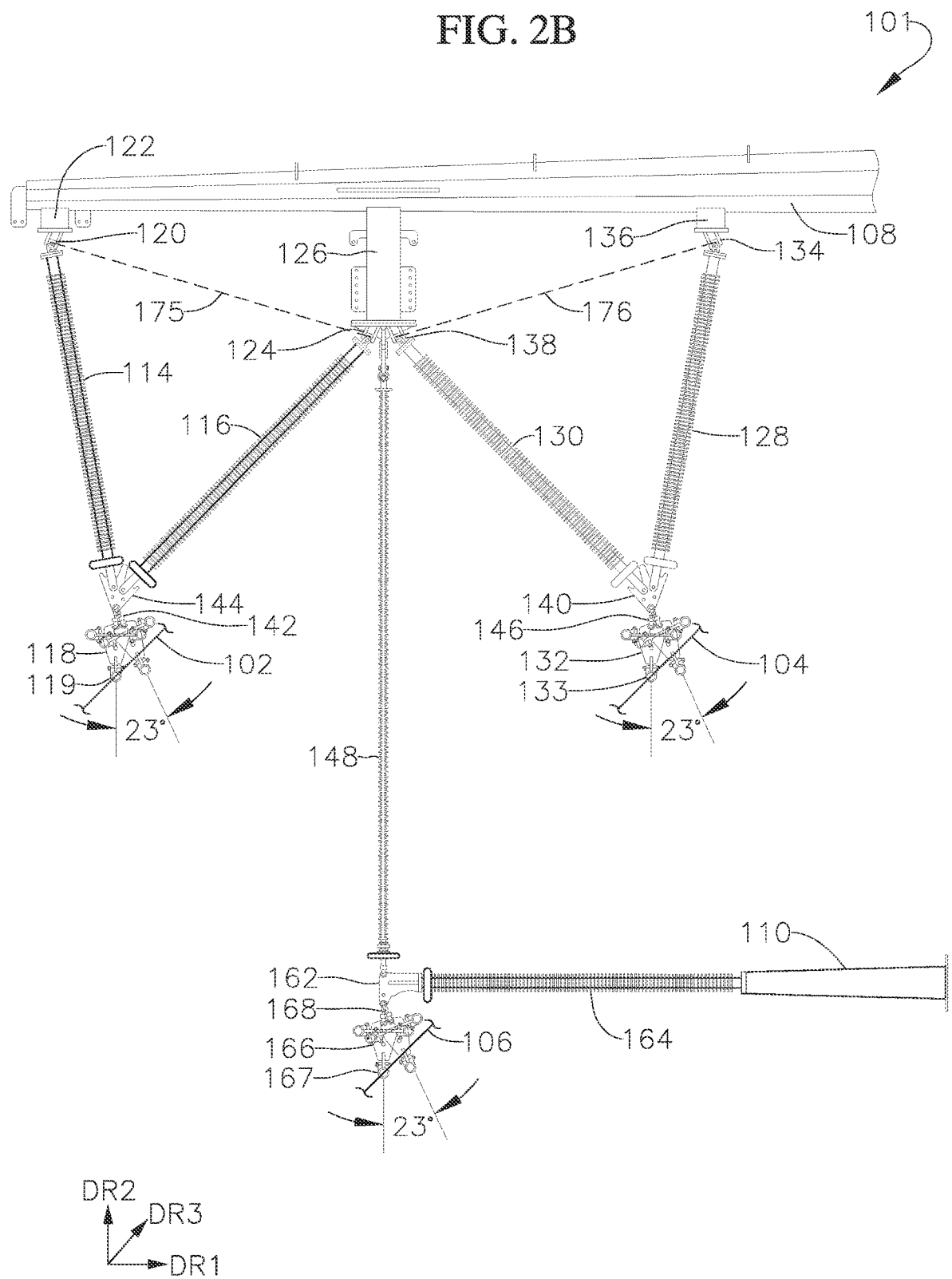
FIG. 2B is a schematic view of the transmission line post assembly of FIG. 2A according to one or more embodiments of the present disclosure.

FIGS. 1A and 2A are front views of a transmission line post assembly 100, 101 according to one or more embodiments of the present disclosure. FIGS. 1B and 2B are schematic views of the transmission line post assembly 100, 101 according to one or more embodiments of the present disclosure.

Referring to FIGS. 1A, 1B, 2A, and 2B, a transmission line post assembly 100, 101 according to one or more embodiments of the present disclose, includes a first phase conductor 102, a second phase conductor 104, and a third phase conductor 106. A number of conductors making up each of the first phase conductor 101, the second phase conductor 104, and the third phase conductor 106 is not limited. For example, each of the first phase conductor 101, the second phase conductor 104, and the third phase conductor 106 may include one, two, three, or four conductors. In one or more embodiments, the first phase conductor 102, the second phase conductor 104, and the third phase conductor 106 may have a voltage of 345 kilovolts (kV). However, the present disclosure is not limited thereto. For example, in other embodiments, the first phase conductor 102, the second phase conductor 104, and the third phase conductor 106 may be transmission lines supporting or having a voltage of 115 kV, 230 kV, or 500 kV.

Figure 3:
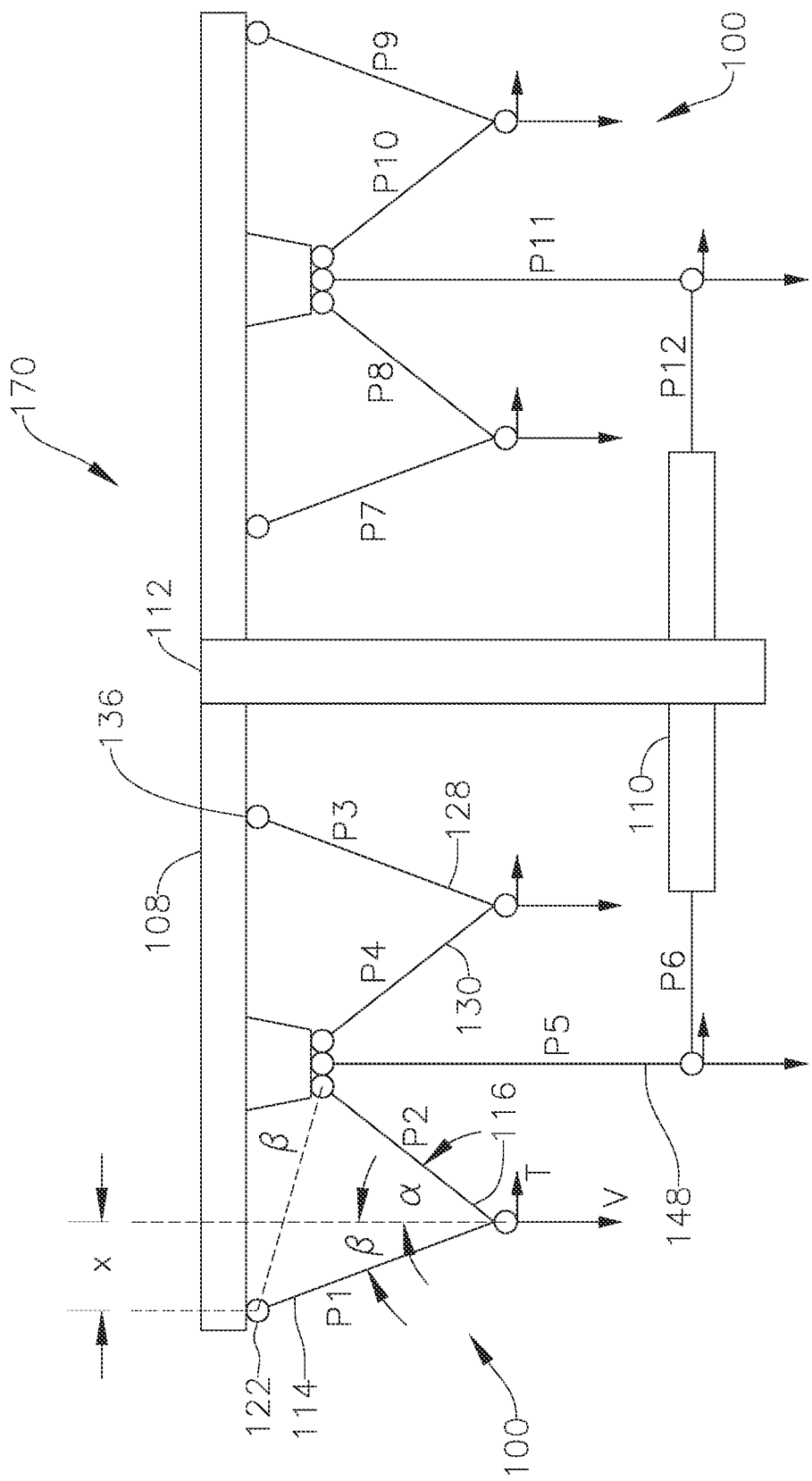
FIG. 3 is a schematic view of a portion of a double circuit tower including transmission line post assemblies on either side of a post according to one or more embodiments of the present disclosure.

The transmission line post assembly 100, 101 may include a first cross arm 108 extending in a first direction DR1 and a second cross arm 110 extending in the first direction DR1. In one or more embodiments, the first cross arm 108 may be above the second cross arm 110 (i.e., the first cross arm 108 may be at a height greater than a height of the second cross arm 110) and may extend further in the first direction DR1 from a post 112 than the second cross arm 110 extends in the first direction DR1 from the post 112. The first cross arm 108 and the second cross arm 110 may be fixed, attached, or coupled to the post 112 extending in the second direction DR2 as shown in FIG. 3. The second direction DR2 may be perpendicular to or normal to the first direction DR1.

When supported by the post 112, the first phase conductor 102 and the second phase conductor 104 may be located at a height (e.g., a height measured along the second direction DR2) above the third phase conductor 106. For example, the first phase conductor 102 and the second phase conductor 104 may be at the same height. The first phase conductor 102, the second phase conductor 104, and the third phase conductor 106 may be at different distances (e.g., distances measured in the first direction DR1) from the post 112 and may be at or adjacent to a same side of the post 112. For example, the second phase conductor 104 and the third phase conductor 106 may be directly adjacent to a first side of the post 112 at the respective heights of the second phase conductor 104 and the third phase conductor 106, and the first phase conductor 102 may be adjacent to the first side of the post 112 at the same height as the second phase conductor 104. Therefore, the second phase conductor 104 and the third phase conductor 106 may be between the first phase conductor 102 and the post 112 in the first direction DR1, and the second phase conductor 104 may be between the third phase conductor 106 and the post 112 in the first direction DR1. As such, the first phase conductor 102, the second phase conductor 104, and the third phase conductor 106 may form an inverted triangular, or inverted delta, configuration. In one or more embodiments, the first phase conductor 102, the second phase conductor 104, and the third phase conductor 106 are spaced apart from each other by, for example, approximately 16 feet for a 345 kV transmission line as shown in FIGS. 1A, 1B, 2A, and 2B to form a compact transmission line post assembly. However, the present disclosure is not limited thereto, and in other embodiments, the first phase conductor 102, the second phase conductor 104, and the third phase conductor 106 may be spaced apart from each other by any suitable distance as dictated by the electrical characteristics of the transmission line such as switching surge. The distance between the first phase conductor 102, the second phase conductor 104, and the third phase conductor 106 may be greater for high voltage transmission lines and lesser for lower voltage transmission lines.

In one or more embodiments, the first phase conductor 102 may be supported by a first post insulator 114 and a second post insulator 116. The first post insulator 114 may include a first end connected to a first yoke plate 118 and a second end connected to a first pivot member 120. The first pivot member 120 may be connected to a first portion 122 of the first cross arm 108 and may enable the first post insulator 114 to pivot or swing about the first pivot member 120 in a longitudinal direction (i.e., a third direction DR3 perpendicular to or normal to the first direction DR1 and the second direction DR2). In one or more embodiments, the second post insulator 116 may include a first end connected to the first yoke plate 118 and a second end connected to a second pivot member 124. The second pivot member 124 may be connected to a cross arm extension 126 extending from or coupled to the first cross arm 108 in a direction opposite to the second direction DR2. The second pivot member 124 may enable the second post insulator 116 to pivot or swing about the second pivot member 124 in a longitudinal direction (i.e., a third direction DR3) about an axis 175 connected to the first pivot member 120 and the second pivot member 124 as shown in FIGS. 1A and 2A.

The first post insulator 114 and the second post insulator 116 may be connected to the same first yoke plate 118 to form a first V-string (i.e., a V-shape arrangement) where the first yoke plate 118 is at the vertex or the base of the first V-string. The first pivot member 120 and the second pivot member 124 may be at ends (e.g., upper ends) of the first V-string such that the first V-string may swing in the longitudinal direction (i.e., the third direction DR3) about the axis 175. Therefore, the first yoke plate 118 connected at the vertex of the base of the first V-string may swing in the longitudinal direction while supporting or holding the first phase conductor 102 via a grip or clamp 119. Accordingly, by providing the first pivot member 120 and the second pivot member 124 connected to the cross bar and the cross arm extension 126 respectively, the first V-string and corresponding first yoke plate 118 may swing longitudinally (i.e., in the third direction) to adapt to imbalances caused by ice loading or broken conductor loading. In one or more embodiments, the first V-string may swing up to about +/−90 degrees in the third direction DR3 about the first pivot and the second pivot members 120, 124 about the axis 175. However, the present disclosure is not limited thereto, and any suitable range of motion may be used depending on the loads applied as will be described in more detail below with reference to FIG. 3.

In one or more embodiments, the second phase conductor 104 may be supported by a third post insulator 128 and a fourth post insulator 130. The third post insulator 128 may include a first end connected to a second yoke plate 132 and a second end connected to a third pivot member 134. The third pivot member 134 may be connected to a second portion 136 of the first cross arm 108 and may enable the third post insulator 128 to pivot or swing about the third pivot member 134 in a longitudinal direction (i.e., a third direction DR3). The second portion 136 of the first cross arm 108 may be closer to the post 112 than the first portion 122 of the first cross arm 108 is to the post 112, and the cross arm extension 126 extending from or coupled to the first cross arm 108 may be between the third pivot member 134 and first pivot member 120. In one or more embodiments, the fourth post insulator 130 may include a first end connected to the second yoke plate 132 and a second end connected to a fourth pivot member 138. The fourth pivot member 138 may be connected to a cross arm extension 126 extending from or coupled to the cross arm in a direction opposite to the second direction DR2. The fourth pivot member 138 may enable the fourth post insulator 130 to pivot or swing about the fourth pivot member 138 in a longitudinal direction (i.e., a third direction DR3) about an axis 176 connected to the third pivot member 134 and the fourth pivot member 132 as shown in FIGS. 1A and 2A.

The third post insulator 128 and the fourth post insulator 130 may be connected to the same second yoke plate 132 to form a second V-string (i.e., a V-shape arrangement) where the second yoke plate 132 is at the vertex or the base of the second V-string. The third pivot member 134 and the fourth pivot member 138 may be at ends (e.g., upper ends) of the second V-string such that the second V-string may swing in the longitudinal direction (i.e., the third direction DR3) about the axis 176. Therefore, the second yoke plate 132 connected at the vertex of the base of the second V-string may swing in the longitudinal direction while supporting or holding the second phase conductor 104 via a grip or clamp 133. Accordingly, by providing the third pivot member 134 and the fourth pivot member 138 connected to the cross bar and the cross arm extension 126 respectively, the second V-string and corresponding first yoke plate 118 may swing longitudinally (i.e., in the third direction) to adapt to imbalances caused by ice loading or broken conductor loading. In one or more embodiments, the second V-string may swing up to about +/−90 degrees in the third direction DR3 about the third pivot member 134 and the fourth pivot member 138 about the axis 176. That is, the brackets 120 and 124 are aligned having the common axis 175 and the brackets 134 and 138 are aligned having the common axis 176 such that longitudinal movement does not cause twisting in the post insulators. Further, because the axes 175 and 176 are not parallel, a smaller right of way is provided. However, the present disclosure is not limited thereto, and any suitable range of motion may be used depending on the loads applied as will be described in more detail below with reference to FIG. 3.

In one or more embodiments, the first V-string and the second V-string may be symmetrical about a center of the cross arm extension 126 (e.g., a line extending in the second direction DR2 through the center of the cross arm extension 126). For example, the first V-string and the second V-string may be arranged to form a W-shape such that the first V-string and the second V-string are on opposite sides of the center line.

Figure 1C:
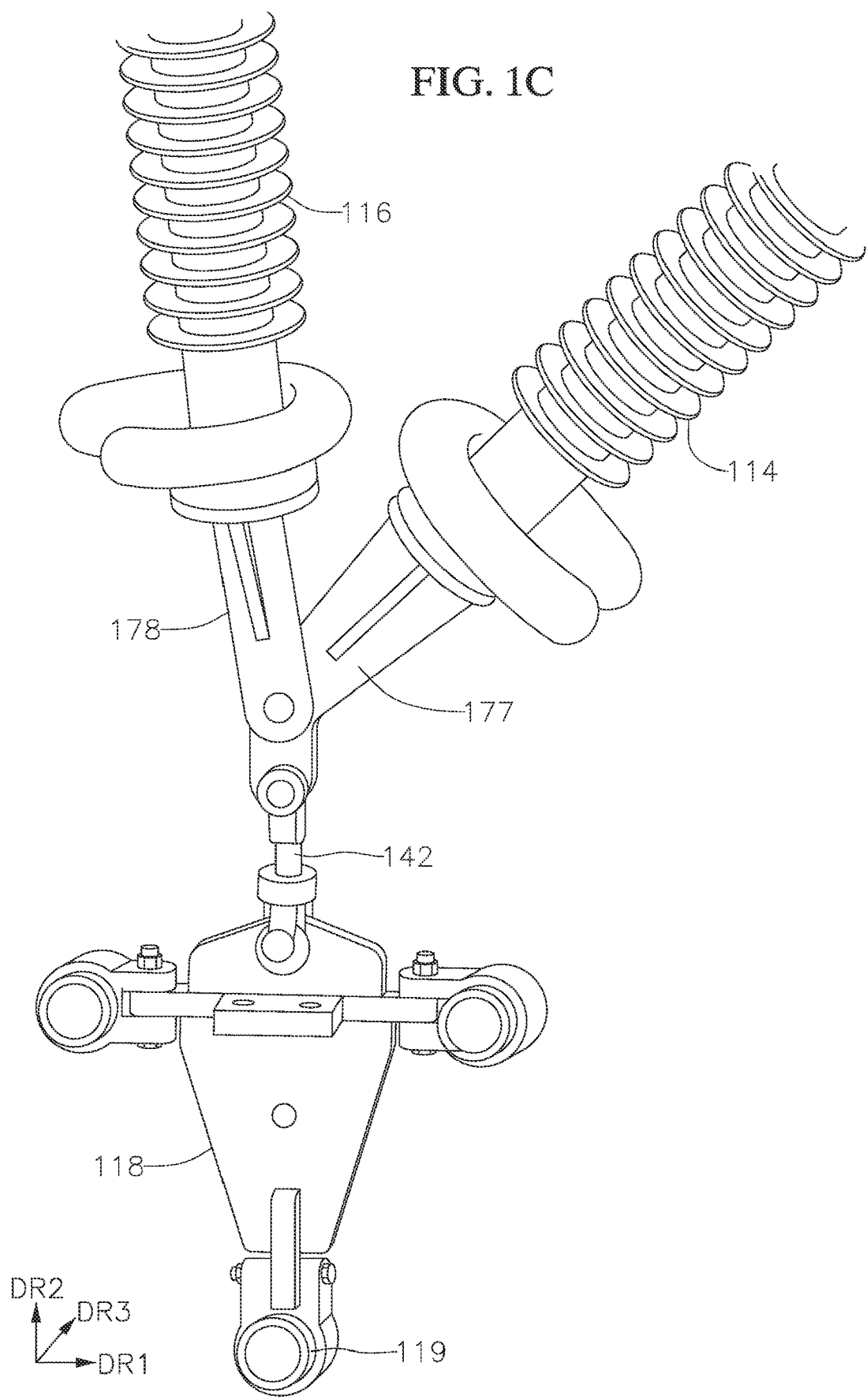
FIG. 1C is an enlarged front views of a first end of a first post insulator, a first end of a second post insulator, and a first yoke plate of FIG. 1A according to one or more embodiments of the present disclosure.
Figure 2C:
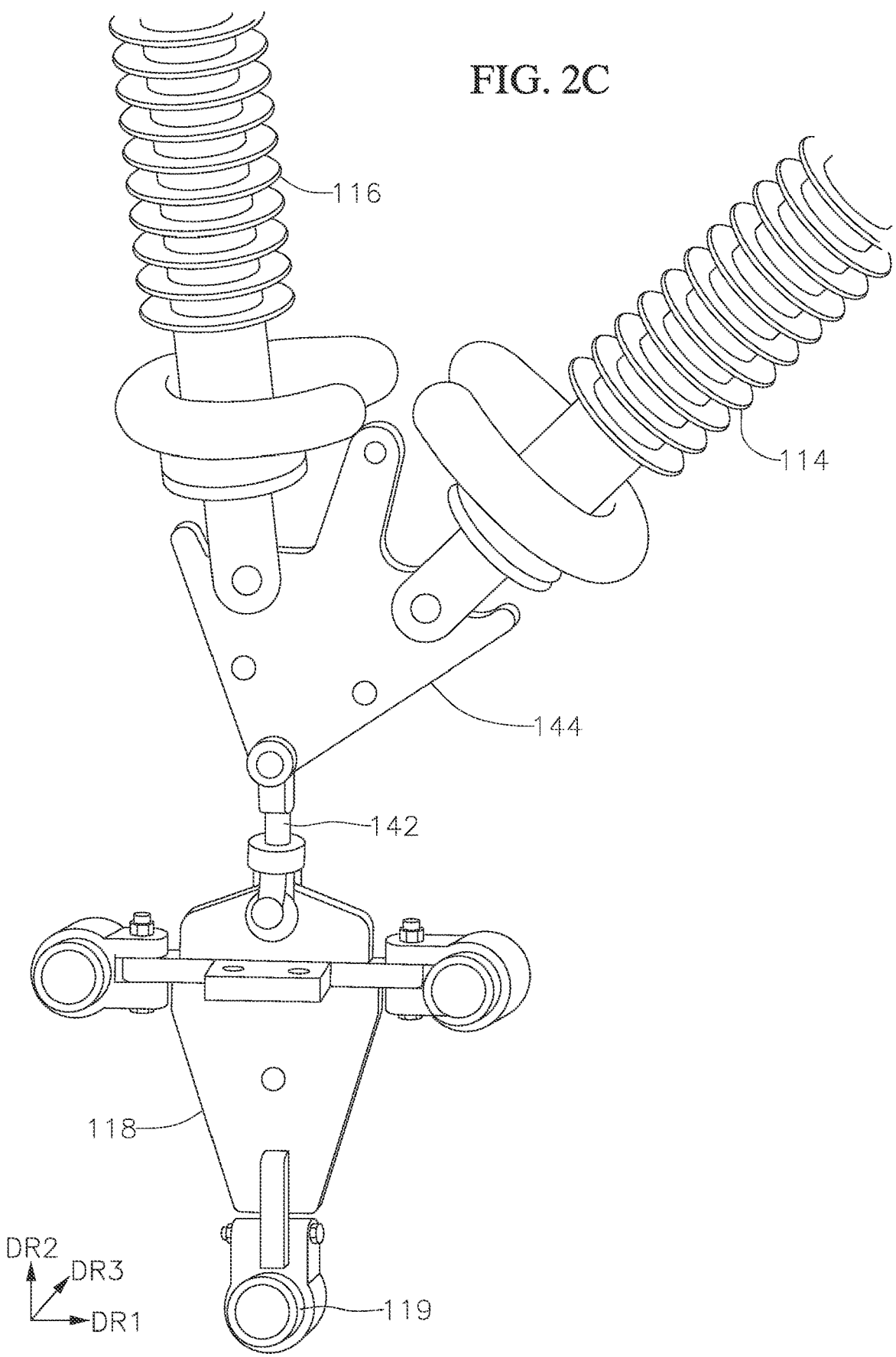
FIG. 2C is an enlarged front view of a first end of a first post insulator, a first end of a second post insulator, and a first yoke plate of FIG. 2A according to one or more embodiments of the present disclosure.

FIGS. 1C and 2C are enlarged front views of a first end of first post insulator 114, a first end of a second post insulator 116, and a first yoke plate according to one or more embodiments of the present disclosure.

Referring to FIGS. 1C and 2C, the first end of the first post insulator 114 and the first end of the second post insulator 116 may be connected to each other. As shown in FIG. 1C, the first end of the first post insulator 114 may be directly connected to the first end of the second post insulator 116 via end plates 177, 178 to form a first V-string. However, the present disclosure is not limited thereto.

For example, as shown in FIG. 2C, the first end of the first post insulator 114 and the first end of the second post insulator 116 may be connected to a first yoke maintenance plate 144 to form the first V-string. In this case, the first yoke maintenance plate 144 may be configured to allow selective removal and/or replacement of the first post insulator 114 and/or the second post insulator 116 as will be discussed in more detail below with reference to FIGS. 4A to 4C.

As shown in FIGS. 1C and 2C, in one or more embodiments, the first end of the first post insulator 114 and the first end of the second post insulator 116 may be connected to, with or without an intervening first yoke maintenance plate 144, the first yoke plate 118 via a Y-clevis ball and Y-clevis socket assembly 142. In one or more embodiments, the Y-clevis ball and Y-clevis socket assembly 142 may allow the first yoke plate 118 to shift up to about +/−60 degrees or about +/−70 degrees in the first direction DR1 (e.g., see FIGS. 1B and 2B). However, the present disclosure is not limited thereto, and in other embodiments, the Y-clevis ball and Y-clevis socket assembly 142 may allow any suitable range of motion in the first direction DR1 for the first yoke plate 118.

In one or more embodiments, the first end of the third post insulator 128 and the first end of the fourth post insulator 130 may be connected to each other to form a second V-string similar to the first V-string shown in FIG. 1C. Further, the first end of the third post insulator 128 and the first end of the fourth post insulator 130 may be connected to a second yoke maintenance plate 140 to allow selective removal and/or replacement of the third post insulator 128 and/or the fourth post insulator 130 as will be discussed in more detail below with reference to FIGS. 4A to 4C. Moreover, the first end of the third post insulator 128 and the first end of the fourth post insulator 130 may be connected to, with or without an intervening second yoke maintenance plate 140, the second yoke plate 132 via a Y-clevis ball and Y-clevis socket assembly 146. In one or more embodiments, the Y-clevis ball and Y-clevis socket assembly 146 may allow the second yoke plate 132 to shift up to about +/−60 degrees or about +/−70 degrees in the first direction DR1 (e.g., see FIGS. 1B and 2B). However, the present disclosure is not limited thereto, and in other embodiments, the Y-clevis ball and Y-clevis socket assembly 146 may allow any suitable range of motion in the first direction DR1 for the second yoke plate 132.

Although a Y-clevis ball and Y-clevis socket assembly 142 is described with reference to FIGS. 1C and 2C, any suitable connection hardware or mechanism may be used that fix the first yoke plate 118 in position or enable a suitable range of motion in the first direction DR1.

In one or more embodiments, as shown in FIGS. 1C and 2C, the first yoke plate 118 may be connected to three grips or clamps (including the grip or clamp 119) at an outer end of the first yoke plate 118. In the illustrated embodiments, the three grips or clamps (including the grip or clamp 119) are fixed to the first yoke plate 118. In other words, the three grips or clamps (including the grip or clamp 119) do not rotate or pivot with respect to the first yoke plate 118. Therefore, in one or more embodiments, the only pivot of the first yoke plate 118 is at an upper ball socket of the first yoke plate 118 that connects to the Y-clevis ball and Y-clevis socket assembly 142. Accordingly, static and dynamic stresses (e.g., due to line angle and transverse loads) at a support point of, for example, the grip or clamp 119 are reduced to protect the first phase conductor 102 from the effects of oscillations.

In one or more embodiments, the three grips or clamps extend outwardly away from the outer end of the first yoke plate 118. For example, the three grips or clamps surround three different sides of the first yoke plate 118. As such, the first yoke plate 118 may have a compact form and allow for maximum or desired line compaction while maintaining desired clearance limits for switching surges and live-line maintenance. The first yoke plate 118 is shown in FIGS. 2F and 2G in further detail including some example dimension in inches. As shown, the first yoke plate 118 may have a compact overall form factor with equivalent strength. However, the dimensions of the first yoke plate 118 are not limited thereto.

In one or more embodiments, the second yoke plate 132 and/or a third yoke plate 166 may include one or more grips or clamps (e.g., the grip or clamp 133 of the second yoke plate 132 and/or the grip or clamp 167 of the third yoke plate 166) that are the same as the grip or clamp 119, and therefore, a redundant description of the grips or clamps of the second yoke plate 132 and/or a third yoke plate 166 will not be repeated.

Although three grips or clamps are described with reference to FIGS. 1C and 2C, any suitable number of grips or clamps may be used and any number of the grips or clamps may be fixed to the corresponding yoke plate. Further, in other embodiments, the grips or clamps may not be fixed (i.e., may rotate or pivot with respect to the corresponding yoke plate). Therefore, in other embodiments, the grips or clamps in addition to the pivot at the upper ball socket of a corresponding yoke plate may rotate or pivot with respect to the corresponding yoke plate due to, for example, line angle and transverse loads.

Figure 1D:
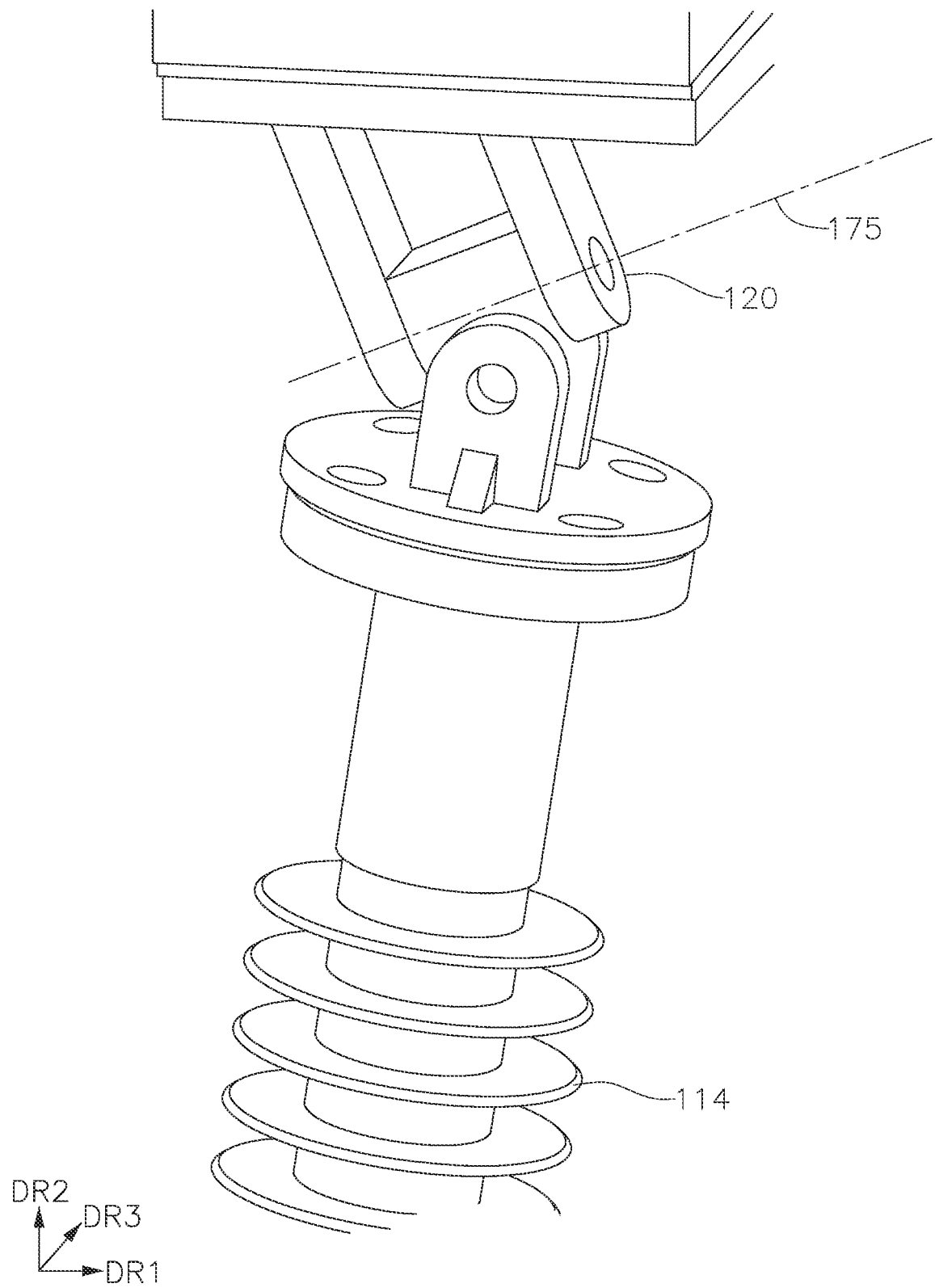
FIG. 1D is an enlarged front view of a second end of the first post insulator, a first pivot member, and a first portion of a first cross arm of FIG. 1A according to one or more embodiments of the present disclosure.
Figure 2D:
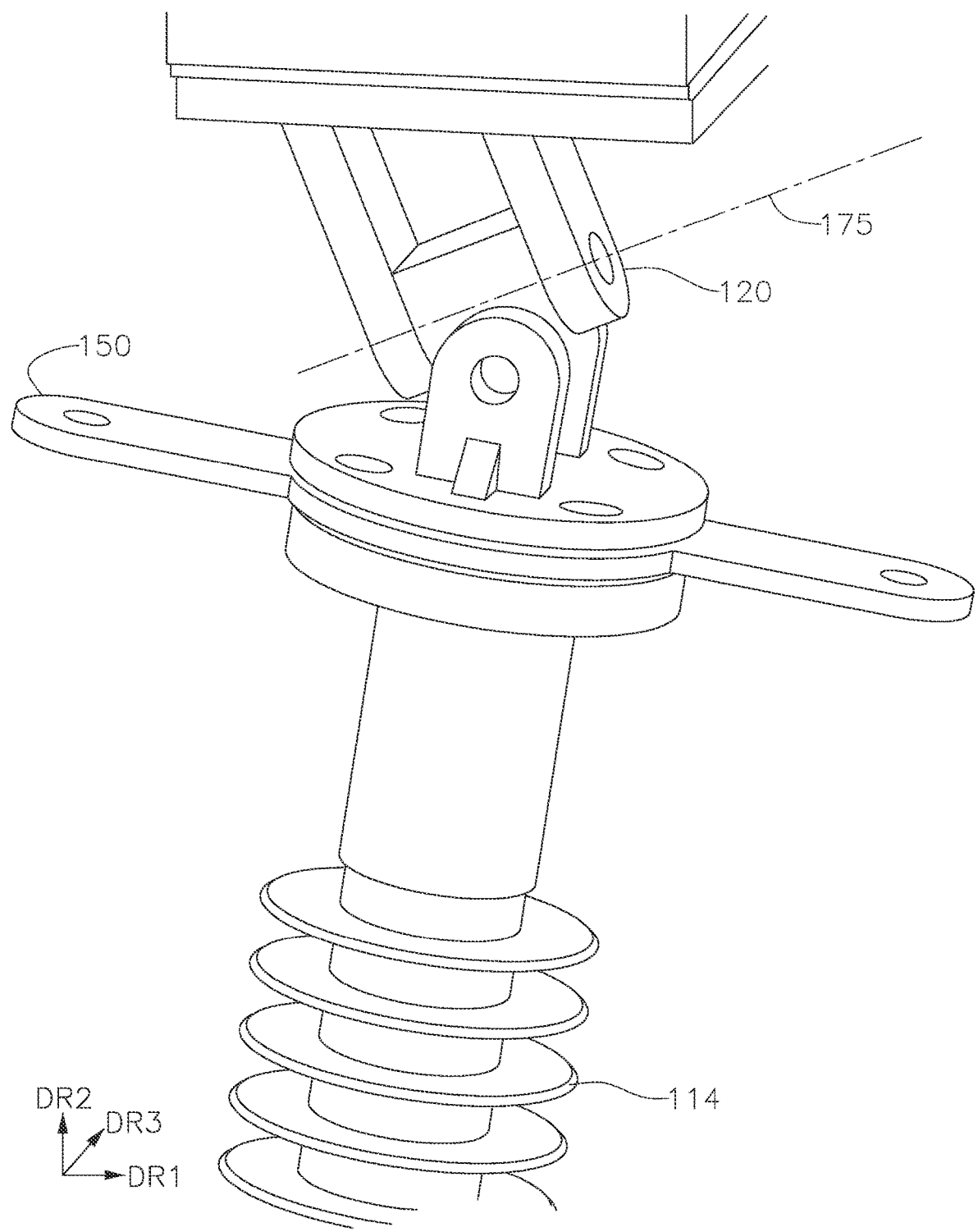
FIG. 2D is an enlarged front view of a second end of the first post insulator, a first pivot member, and a portion of a first cross arm of FIG. 2A according to one or more embodiments of the present disclosure.
Figure 2G:
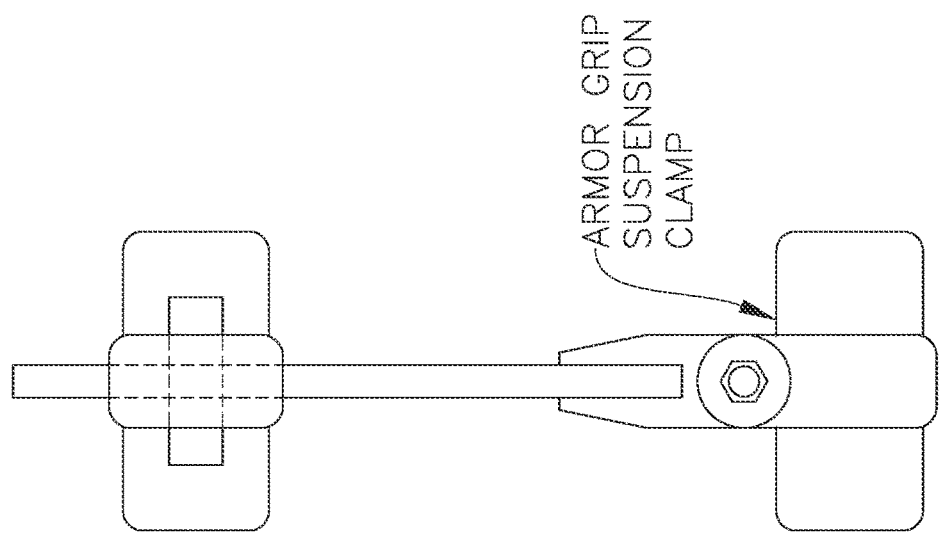
FIGS. 2F and 2G are a front view and a side view, respectively, of a yoke plate according to one or more embodiments of the present disclosure.
Figure 2F:
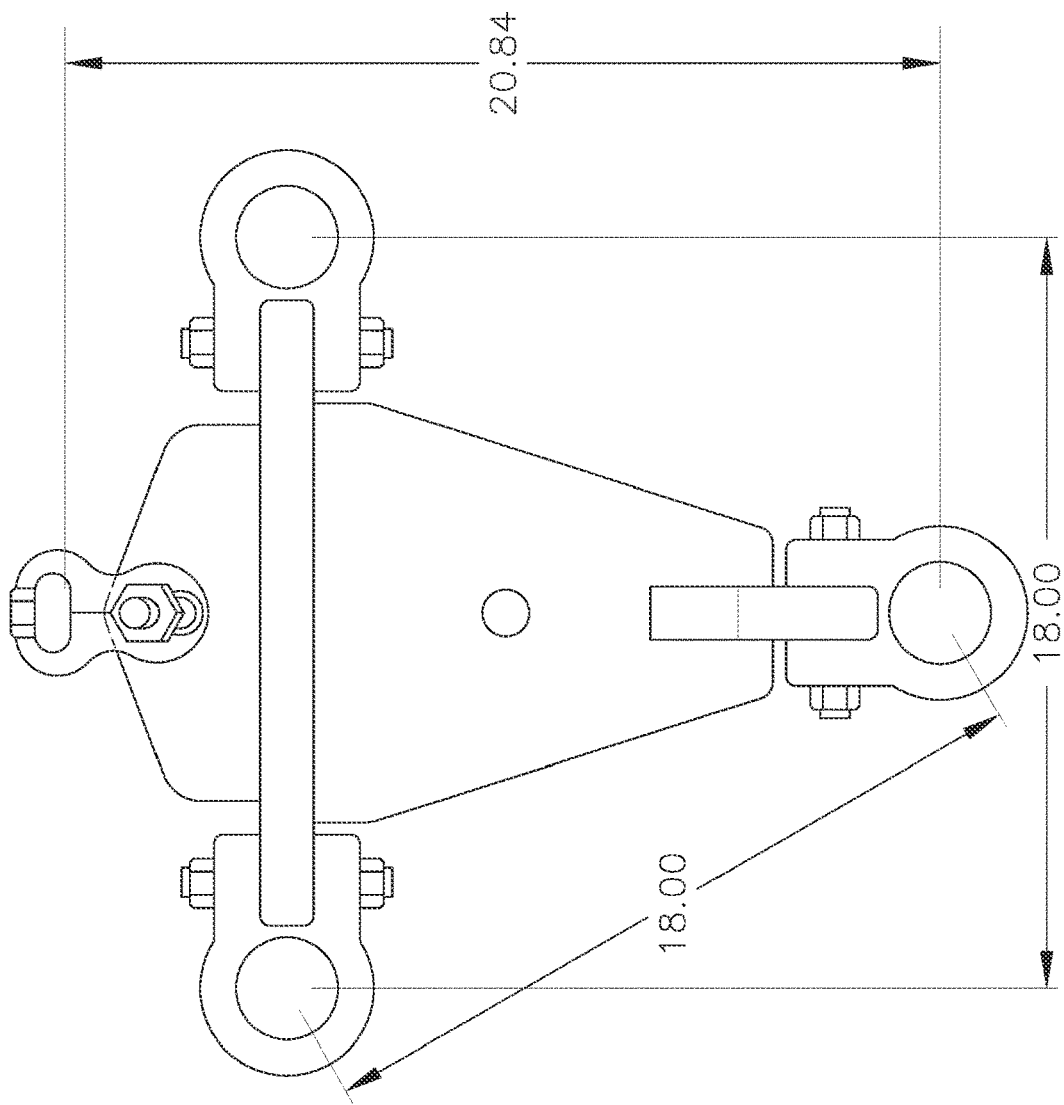

FIGS. 1D and 2D are enlarged front views of a second end of the first post insulator 114, a first pivot member 120, and a portion of a first cross arm 108 according to one or more embodiments of the present disclosure.

Referring to FIGS. 1D and 2D, in one or more embodiments, the second end of the first post insulator 114 may be connected to the first pivot member 120. The first pivot member 120 may be connected to the first portion 122 of the first cross arm 108 and may enable the first post insulator 114 to pivot or swing about the first pivot member 120 in a longitudinal direction (i.e., a third direction DR3) about axis 175.

In one or more embodiments, the first pivot member 120 connected to the first cross arm 108 may be a gimbel joint. However, the present disclosure is not limited thereto, and in other embodiments, the first pivot member 120 may be any structure or joint that allows motion in the longitudinal direction.

In one or more embodiments, the second end of the third post insulator 128 may be connected to the third pivot member 134 such that the third post insulator 128 may pivot or swing about the third pivot member 134 in a longitudinal direction (i.e., a third direction DR3) about the axis 176 similar to the first post insulator 114 and the first pivot member 120 shown in FIGS. 1D and 2D. Further, the third pivot member 134 connected to the first cross arm 108 may be a gimbel joint. However, the present disclosure is not limited thereto, and in other embodiments, the third pivot member 134 may be any structure or joint that allows motion in the longitudinal direction.

Although the second end of the first post insulator 114 is shown in FIG. 1D as directly connected to the first pivot member 120, the present disclosure is not limited thereto. For example, as shown in FIG. 2D, a first bracket 150 may be connected between the first pivot member 120 and the first post insulator 114 to assist in raising or lowering the first post insulator 114 as desired during live-line maintenance.

Figure 1E:
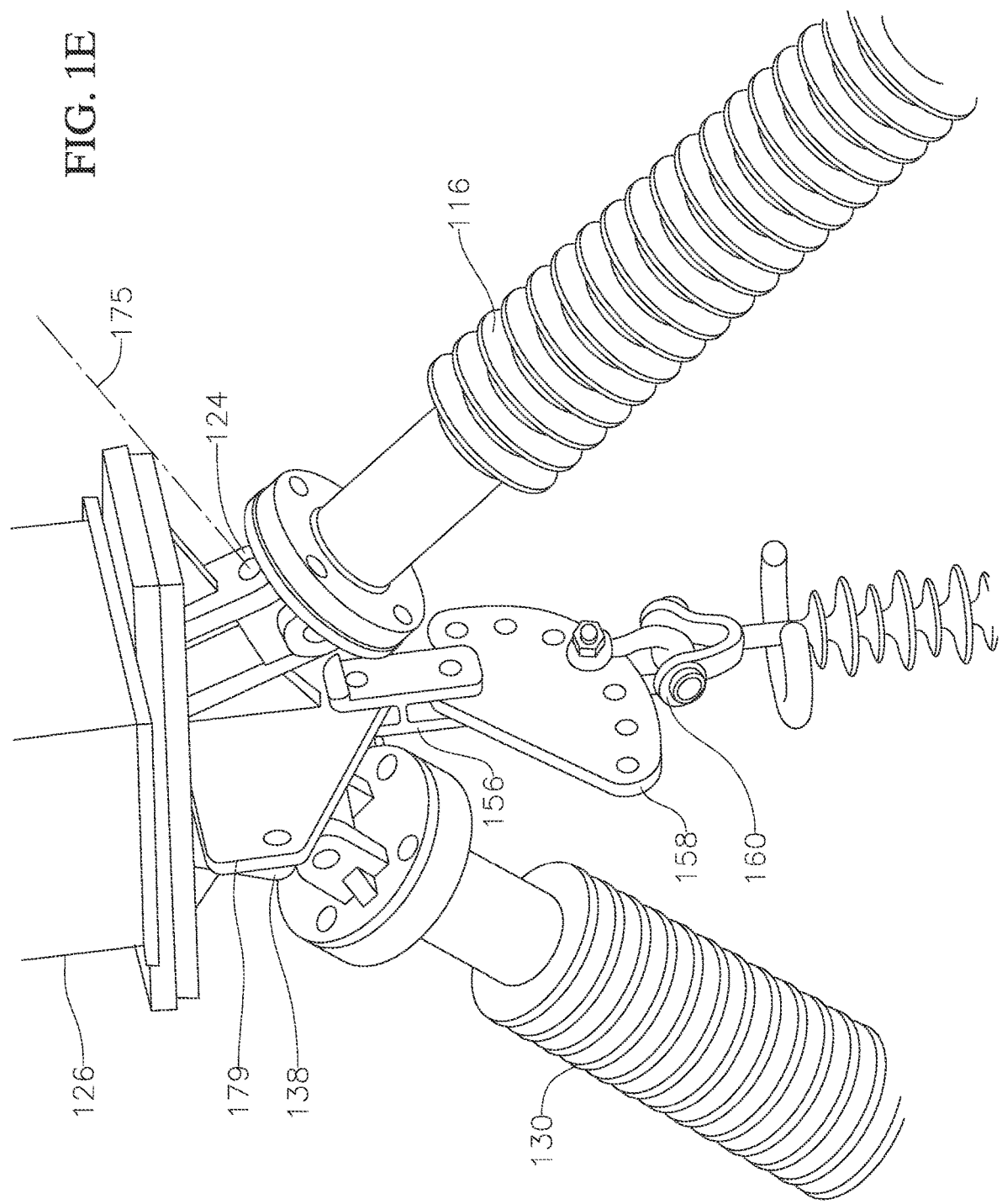
FIG. 1E is an enlarged perspective view of second ends of a second post insulator and a fourth post insulator, a second pivot member, a fourth pivot member, a cross arm extension, and a suspension insulator of FIG. 1A according to one or more embodiments of the present disclosure

FIGS. 1E and 2E are enlarged perspective views of second ends of a second post insulator 116 and a fourth post insulator 130, a second pivot member 124, a fourth pivot member 138, a cross arm extension 126, and a suspension insulator 148 according to one or more embodiments of the present disclosure.

Referring to FIGS. 1E and 2E, in one or more embodiments, the second end of the second post insulator 116 may be connected to the second pivot member 124, and the second end of the fourth post insulator 130 may be connected to the fourth pivot member 138. The second pivot member 124 and the fourth pivot member 138 may enable the second post insulator 116 and the fourth post insulator 130 to pivot or swing about the second pivot member 124 and the fourth pivot member 138 respectively in a longitudinal direction (i.e., a third direction DR3) about the axis 175. The second pivot member 124 and the fourth pivot member 138 may be connected to the cross arm extension 126.

Although the second end of the second post insulator 116 and the second end of the fourth post insulator 130 are shown in FIG. 1E as directly connected to the second pivot member 124 and the fourth pivot member 138 respectively, the present disclosure is not limited thereto. For example, as shown in FIG. 2E, a second bracket 152 may be connected between the second pivot member 124 and the second post insulator 116 and a third bracket 154 may be connected between the fourth pivot member 138 and the fourth post insulator 130 to assist in raising or lowering the second post insulator 116 and the fourth post insulator 130 as desired during live-line maintenance.

In one or more embodiments, a suspension insulator 148 may be connected or fastened to the cross arm extension 126 via a clevis fastener 156, an extension bracket 158, and an anchor shackle 160 as shown in FIGS. 1E and 2E. However, the present disclosure is not limited thereto, and, in other embodiments, the connections to the cross arm extension 126 may be made via any other suitable mounting hardware or device or combination thereof.

The clevis fastener 156, the extension bracket 158, and the anchor shackle 160 may be between the second pivot member 124 and the fourth pivot member 138 such that the suspension insulator 148 extends in a direction opposite to the second direction DR2. In one or more embodiments, the suspension insulator 148 may be suspended from the cross arm extension 126 via a cross arm extension bracket 179 and be between the first V-string and the second V-string. The cross arm extension bracket 179 may be bolted to a bottom portion of the cross arm extension 126 and include the second pivot member 124 and the fourth pivot member 138 (e.g., the second pivot member 124 and the fourth pivot member 138 may form an integral structure with the cross arm extension bracket 179). In this case, the clevis fastener 156, the extension bracket 158, and the anchor shackle 160 may connect to the cross arm extension bracket 179 such that the suspension insulator 148 may be suspended from the cross arm extension 126 via the cross arm extension bracket 179.

Referring to FIGS. 1A, 1B, 2A, and 2B, a cap assembly 162 may be connected between the suspension insulator 148, a fifth post insulator 164 connected to the second cross arm 110, and a third yoke plate 166. The cap assembly 162 may include a first end connected to the third yoke plate 166, a second end connected to the suspension insulator 148, and a third end connected to the fifth post insulator 164. In one or more embodiments, the suspension insulator 148 may extend in a direction substantially parallel to the second direction DR2 (e.g., parallel to the post 112) to connect the cross arm extension bracket 179 and the second end of a cap assembly 162 via a Y-clevis socket, and the fifth post insulator 164 may extend in a direction substantially parallel to the first direction DR1 (e.g., perpendicular or substantially perpendicular to the post 112 or parallel to the first cross arm 108) to connect the second cross arm 110 to the third end of the cap assembly 162. The third yoke plate 166 may be connected to the first end of the cap assembly 162 via a Y-clevis ball and Y-clevis socket assembly 168, and the third yoke plate 166 may support or hold the third phase conductor 106. In one or more embodiments the third yoke plate 166 may support the third phase conductor 106 via a grip or clamp 167.

In one or more embodiments, the Y-clevis ball and Y-clevis socket assembly 168 may allow the third yoke plate 166 to shift up to about +/−60 to about +/−70 degrees in the first direction DR1 (e.g., see FIG. 1B) or up to about 23 degrees in the first direction DR1 (e.g., see FIG. 2B). However, the present disclosure is not limited thereto, and in other embodiments, the Y-clevis ball and Y-clevis socket assembly 168 may allow any suitable range of motion in the first direction DR1 for the third yoke plate 166.

FIG. 3 is a schematic view of a portion of a double circuit tower 170 including transmission line post assemblies 100 and 100 or 101 and 101 on either side of the post 112 according to one or more embodiments of the present disclosure.

Referring to FIG. 3, the portion of the double circuit tower 170 according to an embodiment of the present disclosure includes the transmission line post assembly 100 and 100 or 101 and 101 supported by the post 112. In one embodiment, the post 112 may be a concrete monopole, a lattice tower, or steel pole. However, embodiments of the present disclosure are not limited thereto, and any other post made of suitable materials may be used.

In the illustrated embodiment, the transmission line post assembly 100 or 101 may be supported on opposite sides of the post 112. Therefore, the ROW of circuit tower 170 may be based on length x of the first cross arm 108 of the transmission line post assembly 100, 101 as a reduction in the length x may lead to a reduction at both sides of the circuit tower 170 thereby leading to a reduction in the ROW of the circuit tower 170.

In one or more embodiments, the first post insulator 114, the second post insulator 116, the third post insulator 128, the fourth post insulator 130, and the fifth post insulator 164 may be post type polymer insulators that may support compressive loads. The first post insulator 114 and the second post insulator 116 may form a first V-string, and the third post insulator 128 and the fourth post insulator 130 may form a second V-string. The first V-string and the second V-string may not be symmetrical to reduce ROW and to prevent or substantially prevent undesirable swinging or movement of the corresponding first yoke plate 118 and the corresponding second yoke plate 132. For example, the second V-string may prevent or substantially prevent the second yoke plate 132 adjacent to a side of the post 112 from swinging or moving too far towards the post 112 which may adversely affect the circuit tower 170 (e.g., by blowing out the other side or increasing the ROW of the circuit tower 170). In one or more embodiments, the second yoke plate 132 may not be closer than 102 inches under normal wind speeds from the post 112. However, the present disclosure is not limited thereto, and the distance from the post 112 may depend on the configuration of the circuit tower 170 as a whole.

In one or more embodiments, an angle β may be defined between the first post insulator 114 of the first V-string and a vertical reference line extending through the vertex of the first V-string, and an angle α may be defined between the second post insulator 116 of the first V-string and the vertical reference line extending through the vertex of the first V-string. In one or more embodiments, the angle β may be defined between the third post insulator 128 of the second V-string and a vertical reference line extending through the vertex of the second V-string, and the angle α may be defined between the fourth post insulator 130 of the second V-string and the vertical reference line extending through the vertex of the second V-string.

Depending on line angles (e.g., 0-1 degrees, 0-5 degrees, or 5-10 degrees), the angle β and a length x of the first cross arm 108 may be adjusted based on stress tests. Increases in the length x may increase the ROW of the circuit tower and decreases in the length x may decrease the ROW of the circuit tower.

In one or more embodiments, line angles from 0-1 degrees may be supported by an angle β between 0 to about 10 degrees, and an angle α of about 45 degrees with a corresponding length x of about 2.04 feet. In this case, the distance between the first portion 122 of the first cross arm 108 and the second portion 136 of the first cross arm may be 22 feet, and the total length of first cross arm 108 extending from the post 112 may be about 29.45 feet.

Although the angle β may be between 0 to about 10 degrees, in one or more embodiments, the angle β is set to about 10 degrees to make live-line maintenance at an end of the first cross arm 108 easier.

In one or more embodiments, line angles from 0-5 degrees may be supported by an angle β of about 19 degrees, and an angle α of about 45 degrees with a corresponding length x of about 3.99 feet.

In one or more embodiments, line angles from 5-10 degrees may be supported by an angle β of about 34 degrees, and an angle α of about 45 degrees with a corresponding length x of about 7.81 feet.

To accommodate adjustments for different line angles, in addition to adjusting the length x, the height of the cross arm extension 126 extending in the direction opposite to the second direction DR2 and range of motion of the pivot members 120, 124, 134, 138 may be suitably adjusted (e.g., reducing the height of the cross arm extension 126 with corresponding changes in the angle of the axes 175, 176 relative to a horizontal axis in the direction DR1.

Therefore, depending on the application, different angles may be used with different corresponding lengths x, height of the cross arm extension 126, and/or range of motion of the pivot members in the longitudinal direction based on stress testing. Accordingly, a compact transmission line post assembly with a reduced ROW (e.g., by reducing the length x) may be provided.

Figure 4A:
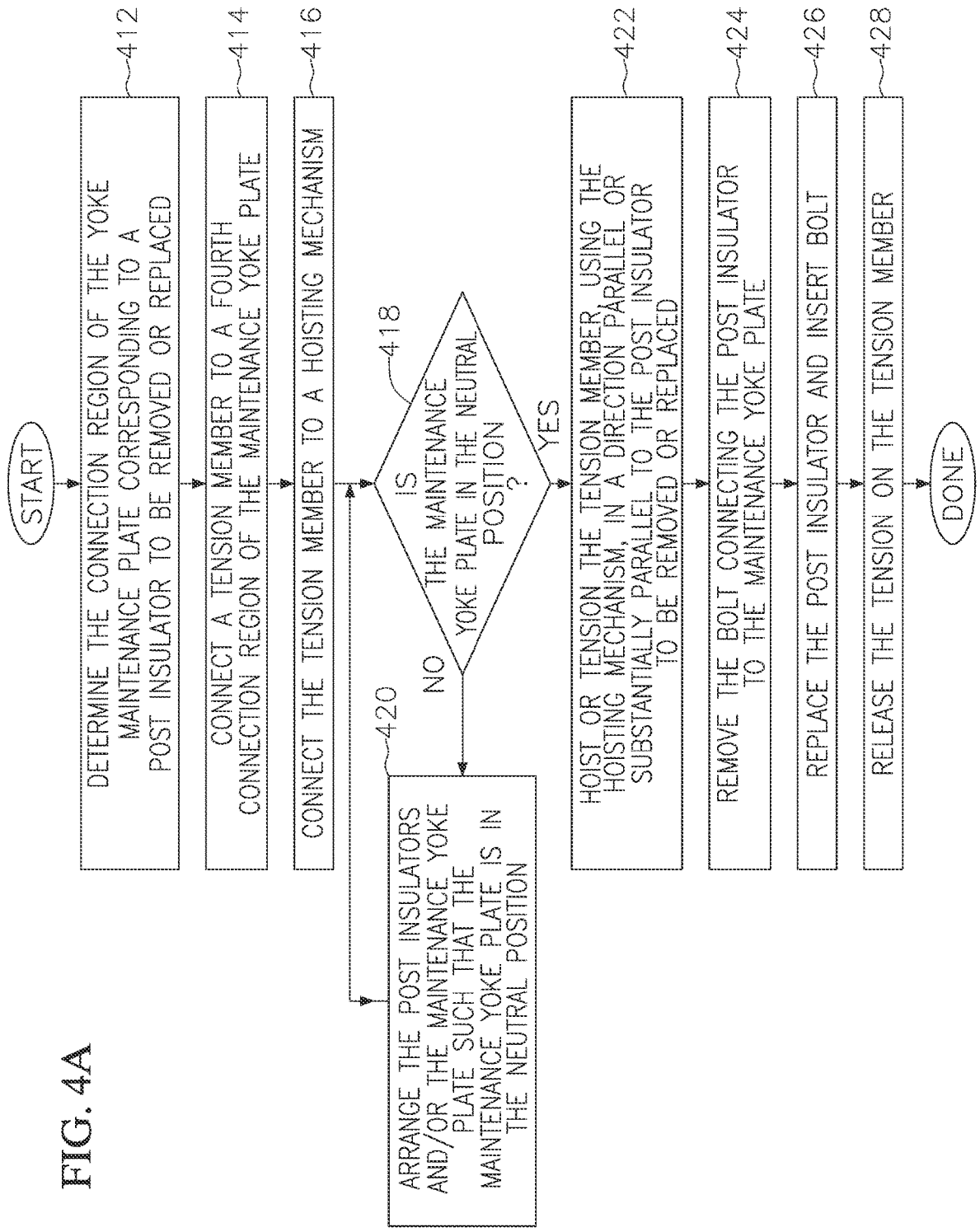
FIG. 4A is a flowchart depicting removing and replacing a post insulator of the transmission line post assembly according to one or more embodiments of the present disclosure.
Figure 4B:
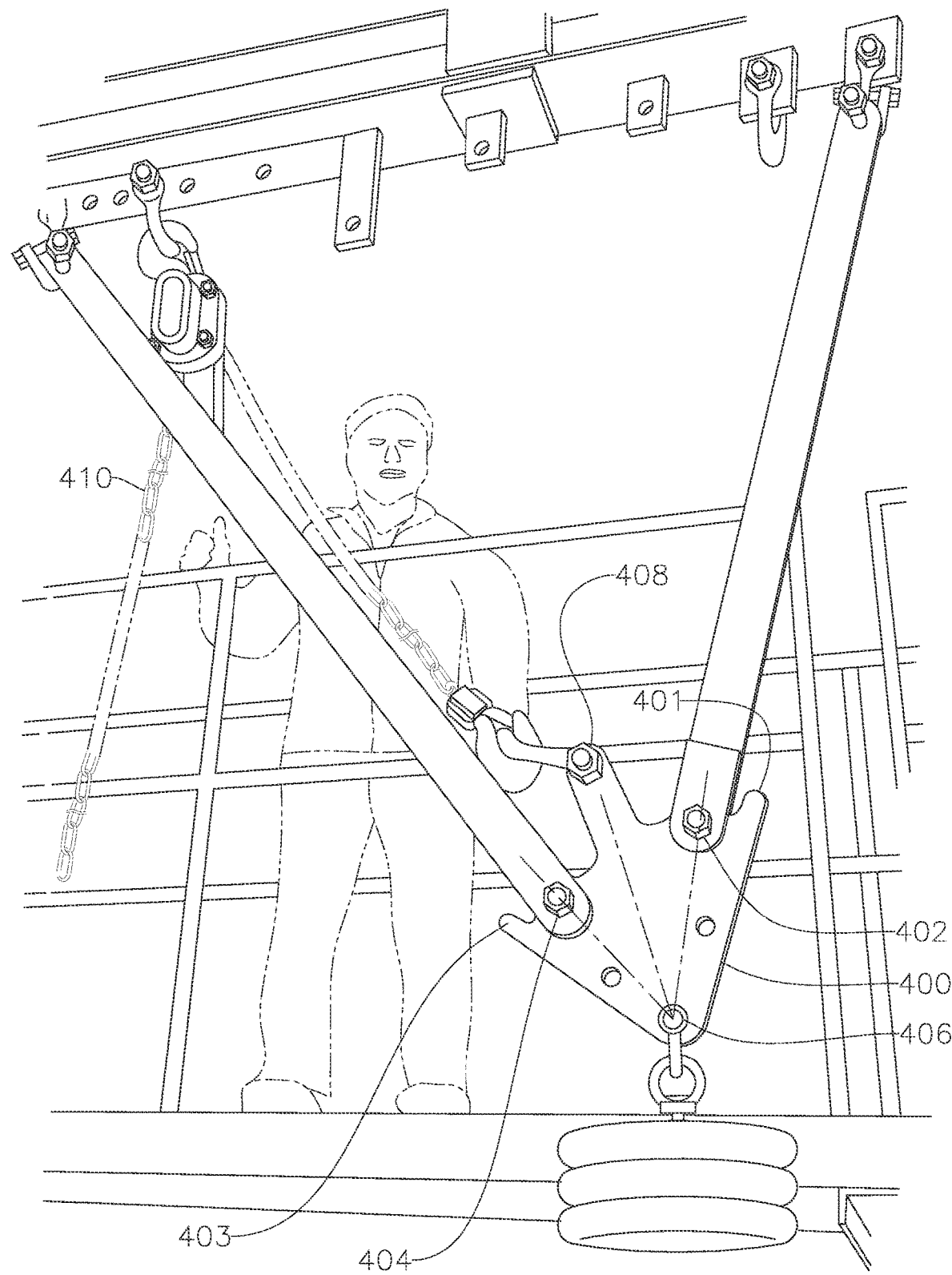
FIGS. 4B and 4C are annotated front views of depicting removal of a bolt from a yoke maintenance plate according to one or more embodiments of the present disclosure.
Figure 4C:
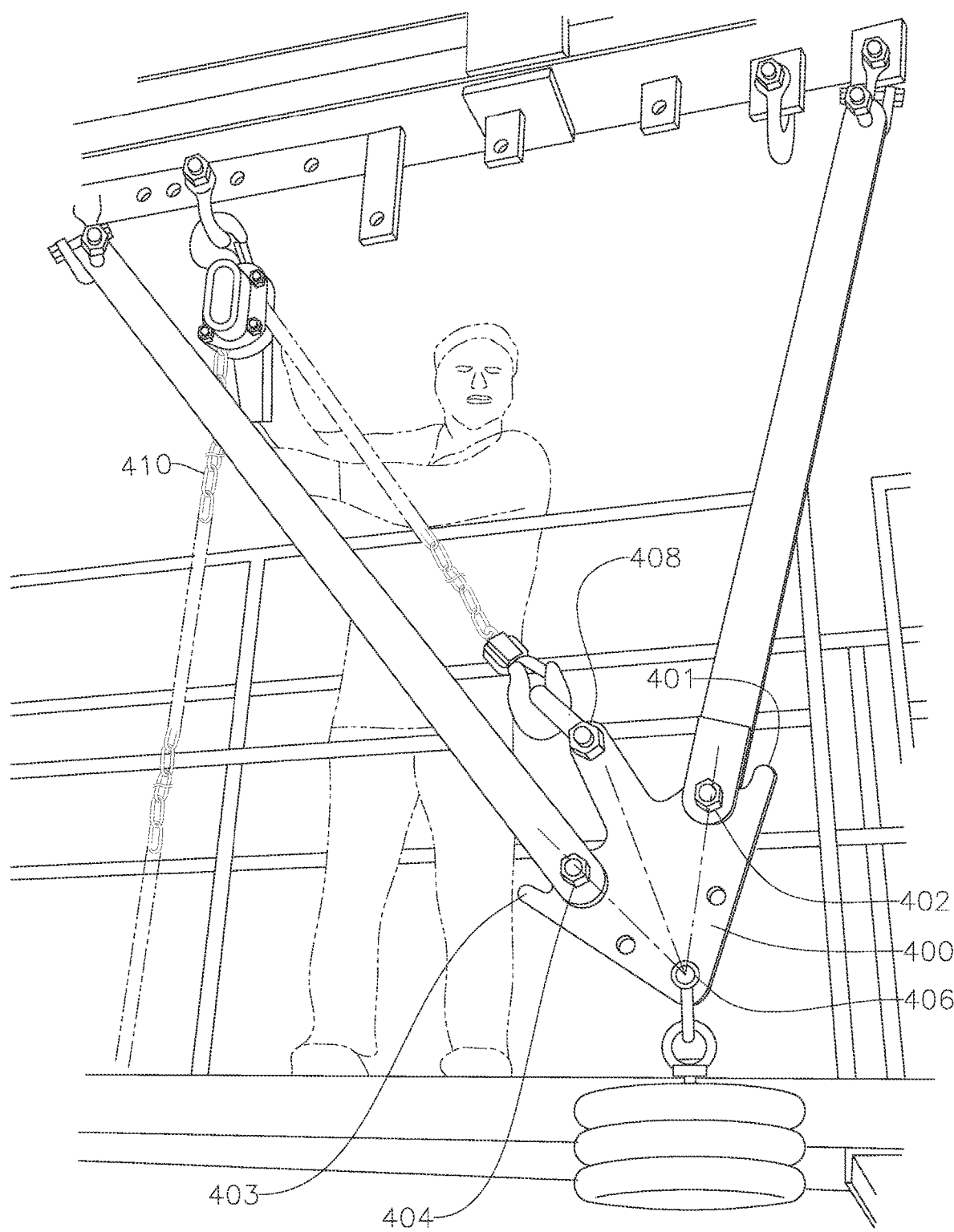

FIG. 4A is a flowchart depicting removing and replacing a post insulator of the transmission line post assembly according to one or more embodiments of the present disclosure. FIGS. 4B and 4C are annotated front views of depicting removal of a bolt from a yoke maintenance plate according to one or more embodiments of the present disclosure.

Referring to FIGS. 4A to 4C, in one or more embodiments, the transmission line post assembly may include a yoke maintenance plate 400 such as, for example, the first yoke maintenance plate 144 and the second yoke maintenance plate 140 shown in FIGS. 2A to 2C for live-line maintenance. The yoke maintenance plate 400 may include a first connection region 402, a second connection region 404, a third connection region 406, and a fourth connection region 408. The first connection region 402 and the second connection region 404 may each be configured to connect to a post insulator such as, for example, the first post insulator 114, the second post insulator 116, the third post insulator 128, or the fourth post insulator 130 as shown in FIGS. 2A to 2E. The third connection region 406 may be configured to connect to a yoke plate such as, for example, the first yoke plate 118 or the second yoke plate 132 as shown in FIGS. 2A to 2C. The fourth connection region 408 may be configured to connect to a tension member 410 such as a chain. In one or more embodiments, the tension member 410 may be connected to a hoisting mechanism such as a chain hoist and insulating stick for live-line maintenance to selectively tension or hoist the tension member 410.

In one or more embodiments, a method of using the yoke maintenance plate 400 for live-line maintenance includes determining the connection region of the yoke maintenance plate corresponding to a post insulator to be removed or replaced (412). For example, first connection region 402 may be identified as corresponding to a post insulator connected to the yoke maintenance plate 400 at the first connection region 402, and the second connection region 404 may be identified as corresponding to a post insulator connected to the yoke maintenance plate 400 at the second connection region 404.

The method may further include connecting a tension member 410 (e.g., a chain or any other suitable device) to the fourth connection region 408 of the yoke maintenance plate 400 (414), and connecting the tension member 410 to a hoisting mechanism (416). Together, the hoisting mechanism and the tension member 410 may be used to lift or pull the yoke maintenance plate 400 in a set direction.

Prior to applying tension or hoisting the tension member 410, the method may further include determining whether the yoke maintenance plate 400 is in the neutral position (418). The neutral position of the yoke maintenance plate 400 refers to an arrangement of the yoke maintenance plate 400 and the post insulators connected to the yoke maintenance plate 400. In particular, the yoke maintenance plate 400 is in the neutral position when both a first gap is defined between a first distal end 401 of the yoke maintenance plate 400 and a post insulator attached to the first connection region 402 adjacent to the first distal end 401, and a second gap is defined between a second distal end 403 of the yoke maintenance plate 400 and a post insulator attached to the second connection region 404 adjacent to the second distal end 403. In other words, the yoke maintenance plate 400 is in the neutral position when both the first gap and the second gap adjacent to the distal ends 401, 403 are present. If the yoke maintenance plate 400 is not in the neutral position, then the post insulators attached to the yoke maintenance plate 400 and/or the yoke maintenance plate 400 should be arranged such that the yoke maintenance plate 400 is in the neutral position (420). In other words, the post insulators attached to the yoke maintenance plate 400 and/or the yoke maintenance plate 400 may be arranged to form the first gap and the second gap.

In one or more embodiments, the method may further include hoisting or tensioning the tension member 410, using the hoisting mechanism, in a direction parallel or substantially parallel to the post insulator to be removed or replaced (422). By lifting or pulling the yoke maintenance plate 400 out of the neutral position and towards the post insulator to be removed or replaced, a bolt connecting the yoke maintenance plate 400 to the post insulator may become loose. Therefore, the method may further include removing the bolt connecting the post insulator to the yoke maintenance plate 400 (424), and replacing the post insulator prior to inserting a bolt (e.g., the same bolt or another bolt) (426) to connect the replaced post insulator to the yoke maintenance plate 400. After the post insulator is connected to the yoke maintenance plate 400, the tension applied to the tension member 410 by the hoisting mechanism may be released (426) thereby completing live-line maintenance (e.g., replacing a post insulator of the transmission line post assembly).

FIGS. 5A to 5E show an apparatus and method of performing live line maintenance of a transmission line assembly according to one or more embodiments of the present disclosure.

Figure 5A:
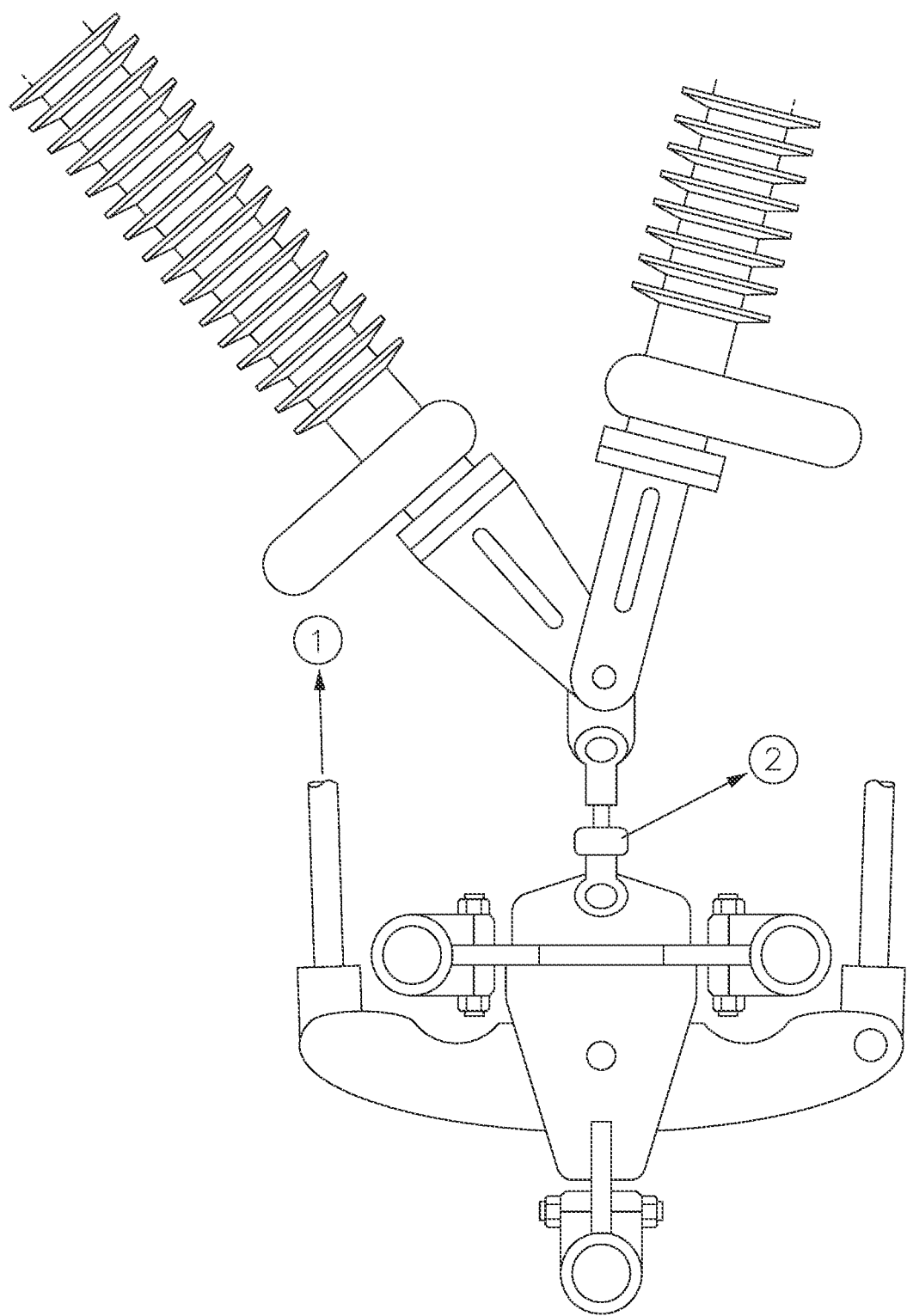
FIGS. 5A to 5E show an apparatus and method of performing live line maintenance of a transmission line assembly according to one or more embodiments of the present disclosure.

Referring to FIG. 5A, a method of performing live-line maintenance includes lifting and/or supporting the weight of a yoke plate. In one or more embodiments, the lifting may be performed by any suitable mechanism. For example, as shown in FIG. 5A, a lifting member may be attached to the yoke plate. The lifting member may have distal ends positioned at opposite sides of the yoke plate to lift the yoke plate away from the ground. The method of performing live-line maintenance further includes disconnecting the yoke plate from a pair of post insulators including a first post insulator and a second post insulator by pulling a socket cotter pin at an upper ball socket of the yoke plate. Accordingly, the weight of the yoke plate may be supported and the yoke plate may be disconnected.

Figure 5B:
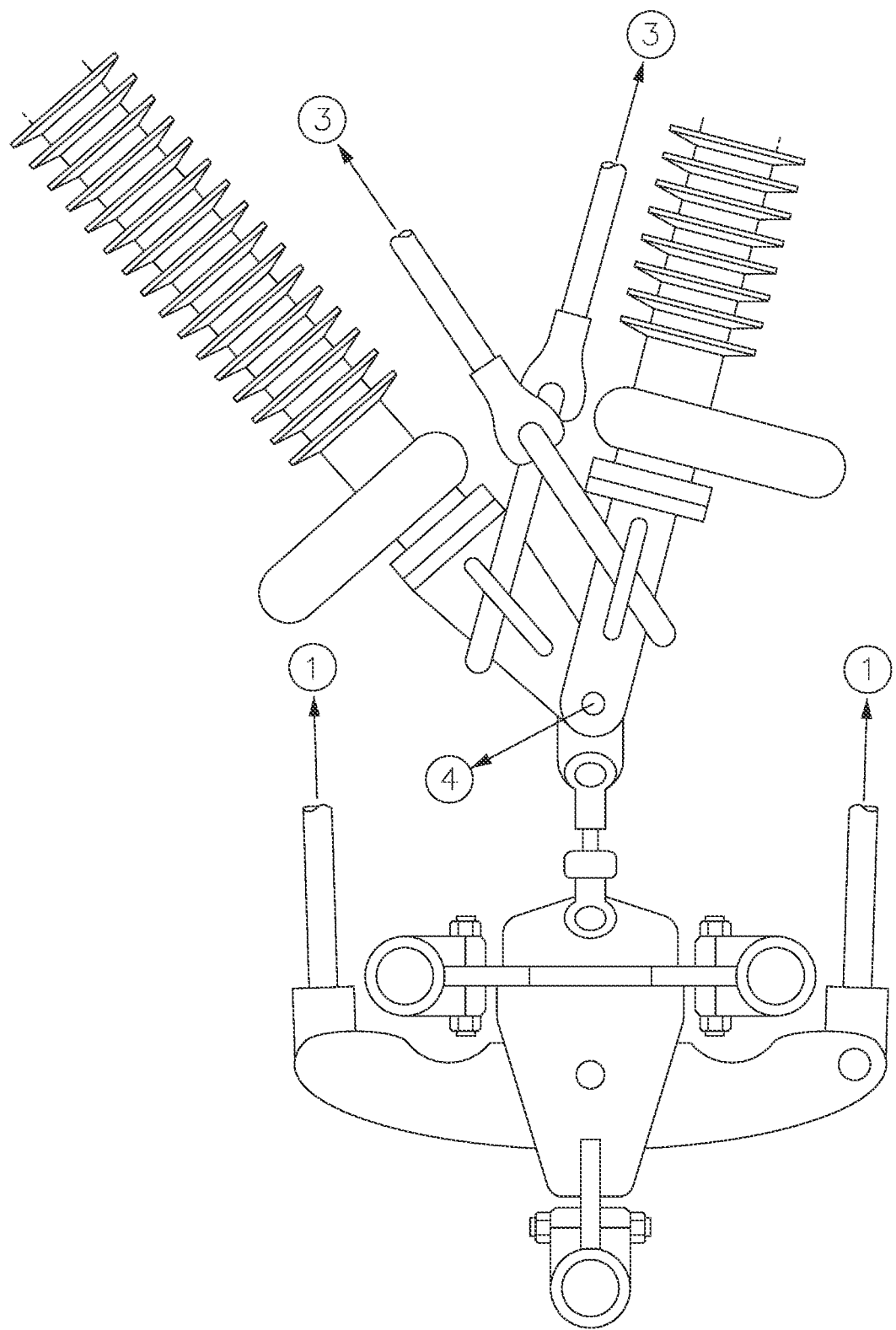
Figure 5C:
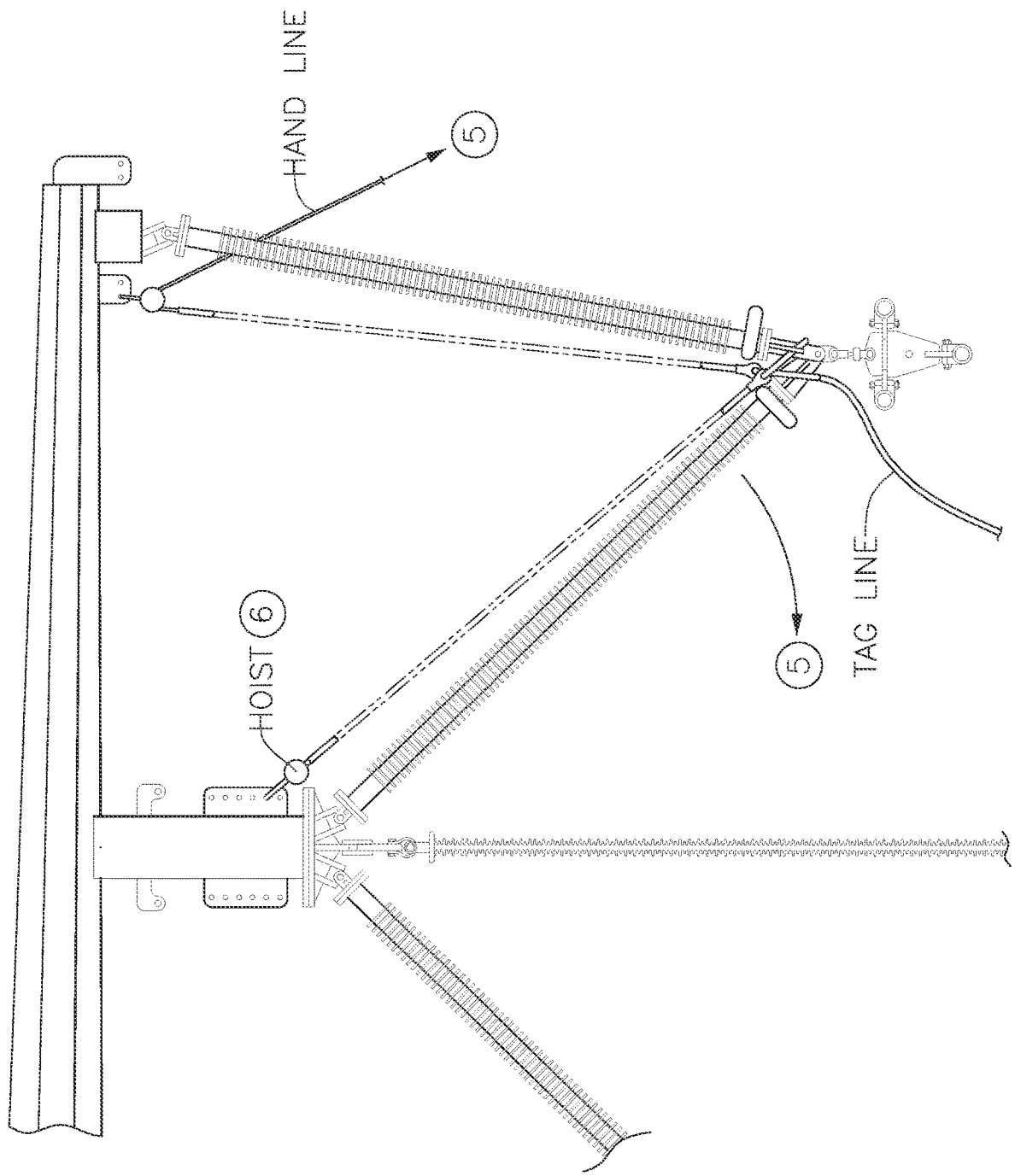
Figure 5D:
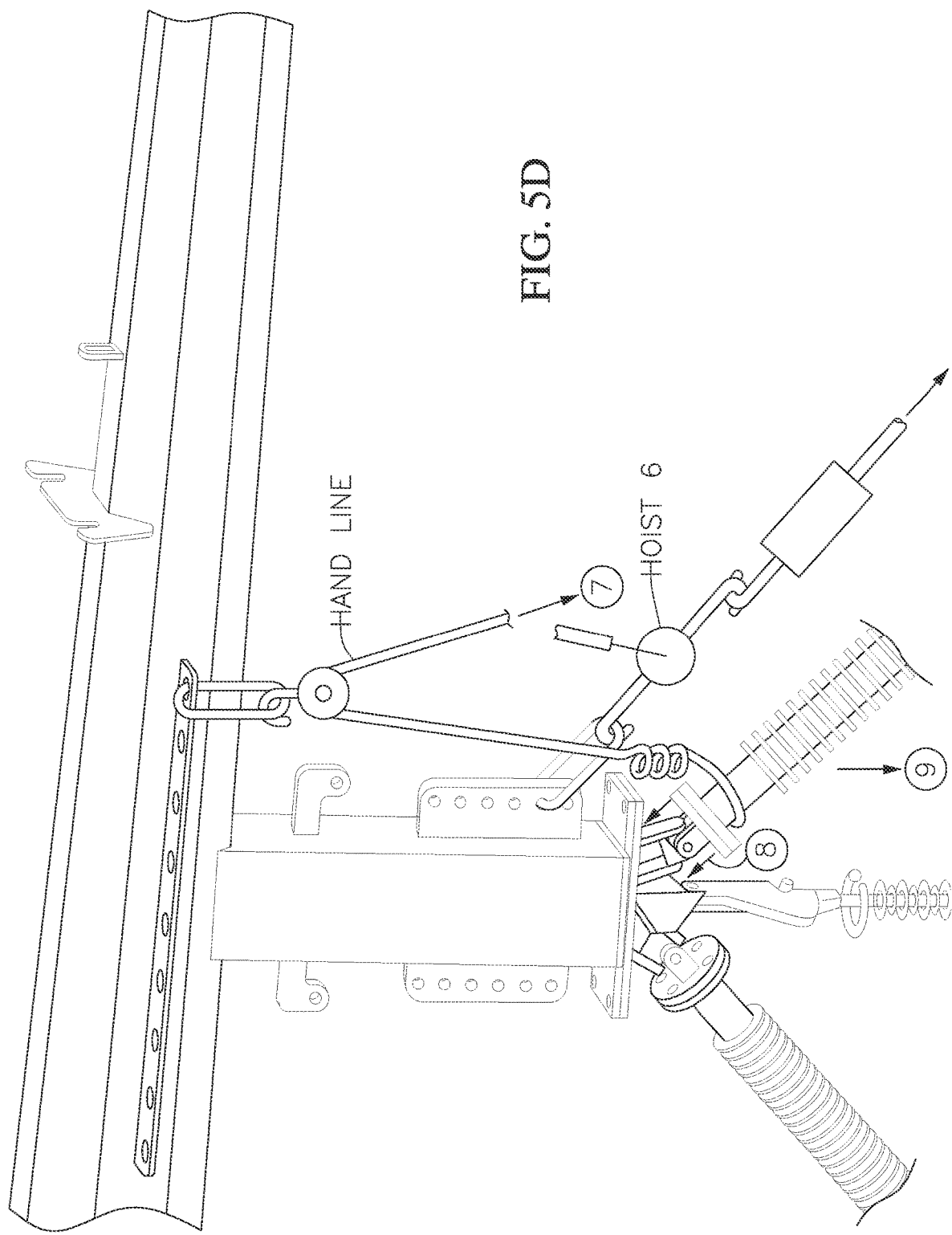
Figure 5E:
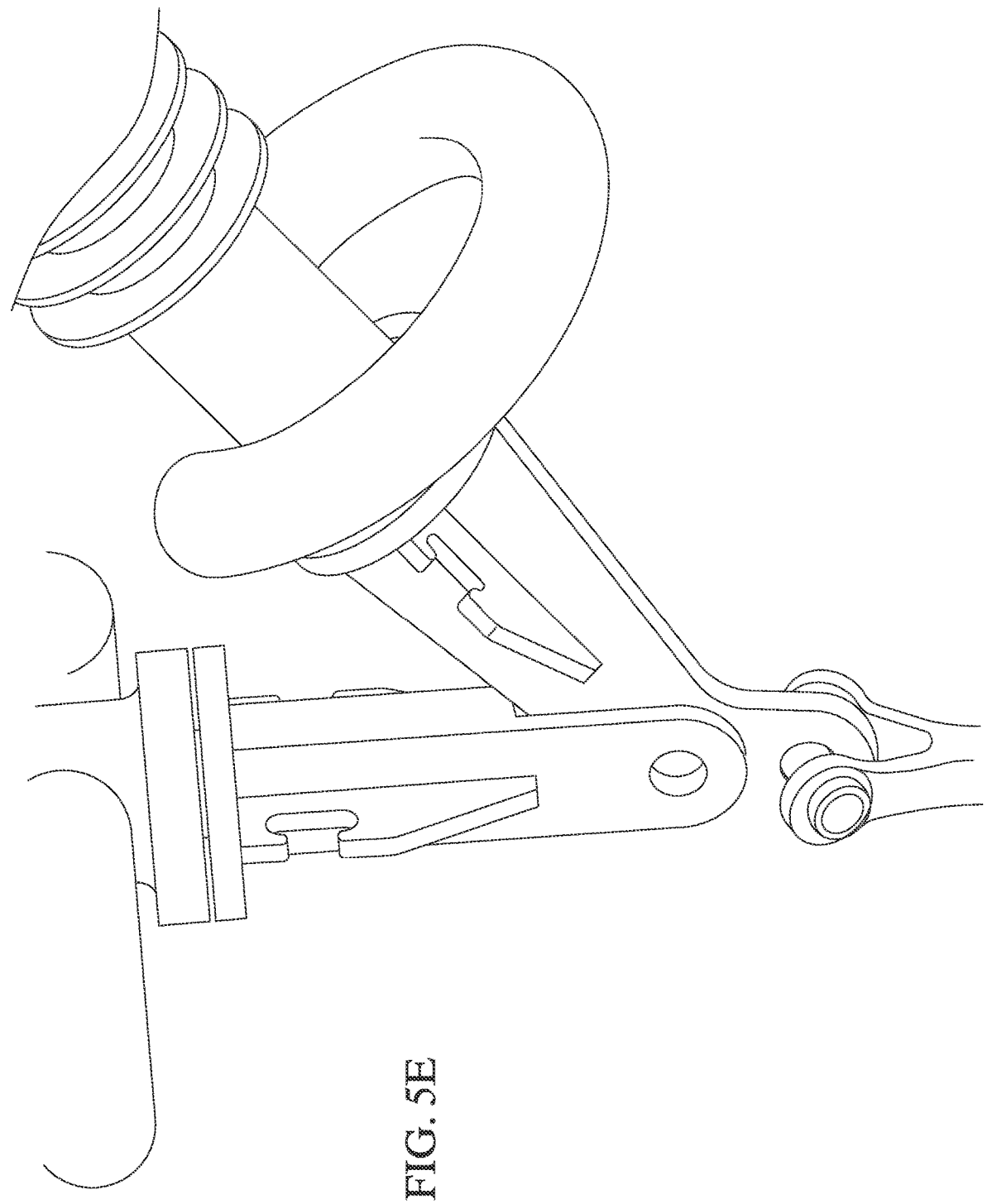
Figure 6A:
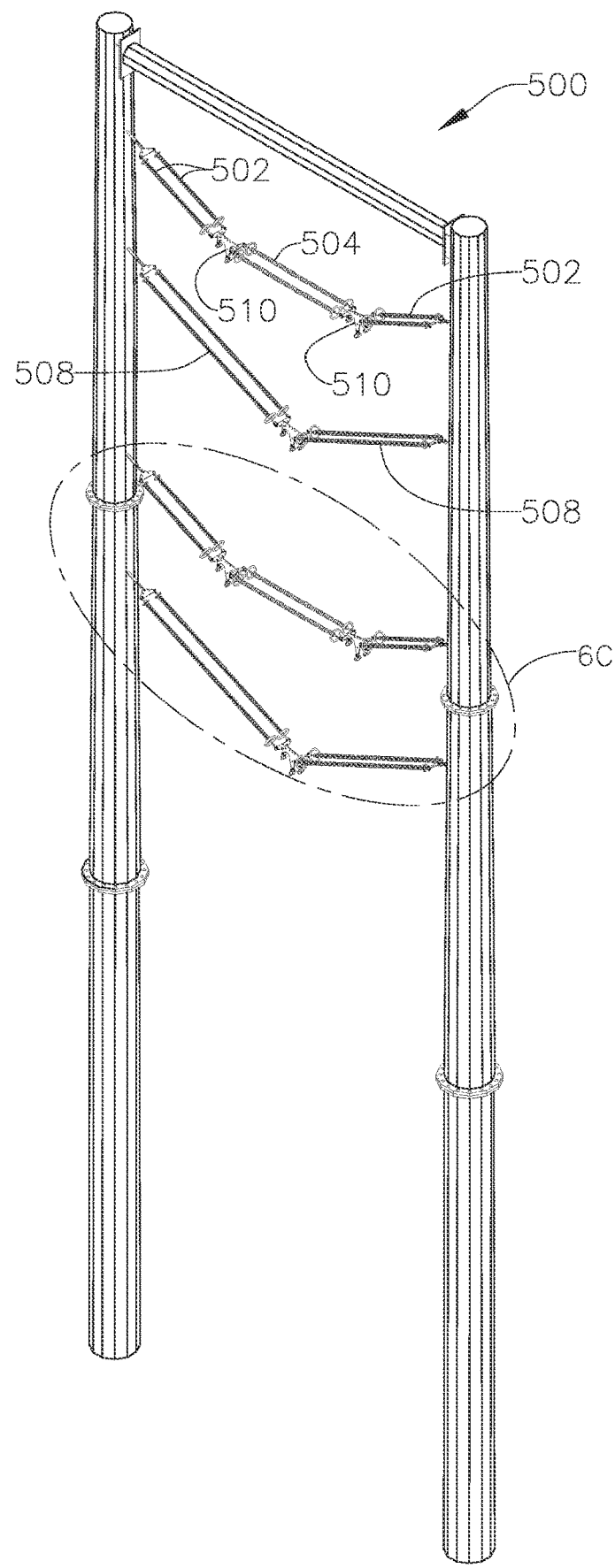
FIGS. 6A and 6B are a perspective view and a front view, respectively, of a transmission line post assembly according to one or more embodiments of the present disclosure.
Figure 6B:
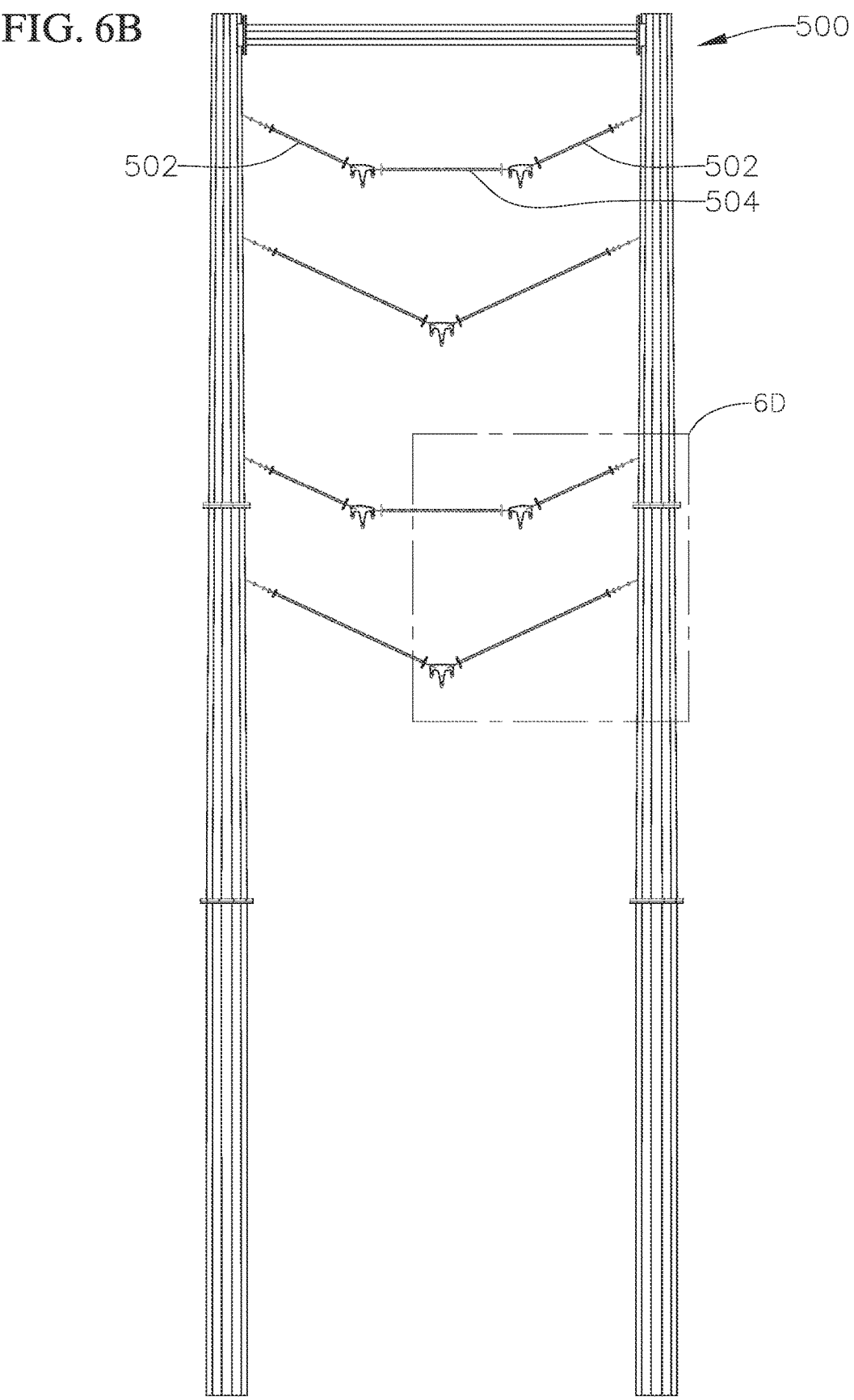
Figure 6C:
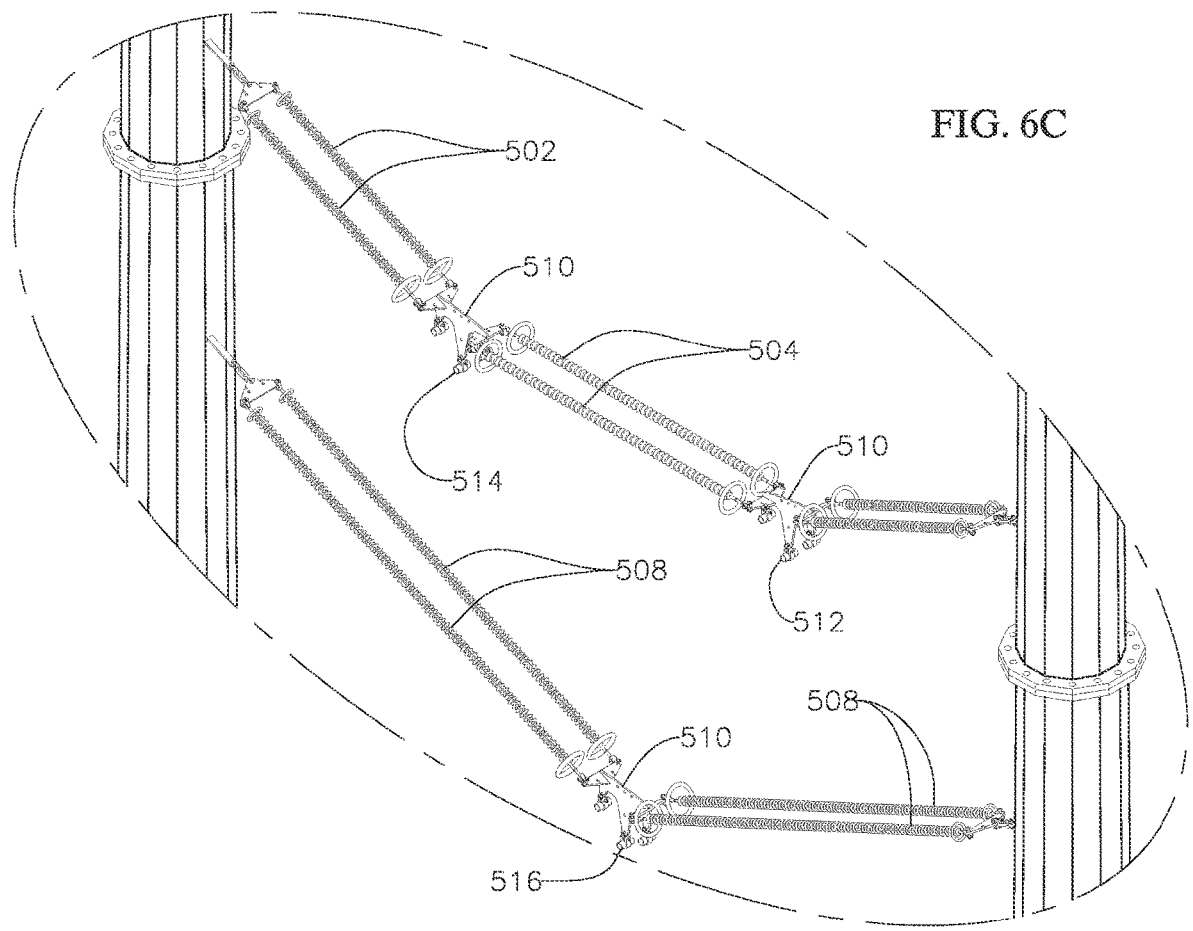
FIGS. 6C and 6D are enlarged views of regions "6C" and "6D" of FIGS. 6A and 6B, respectively.
Figure 6D:
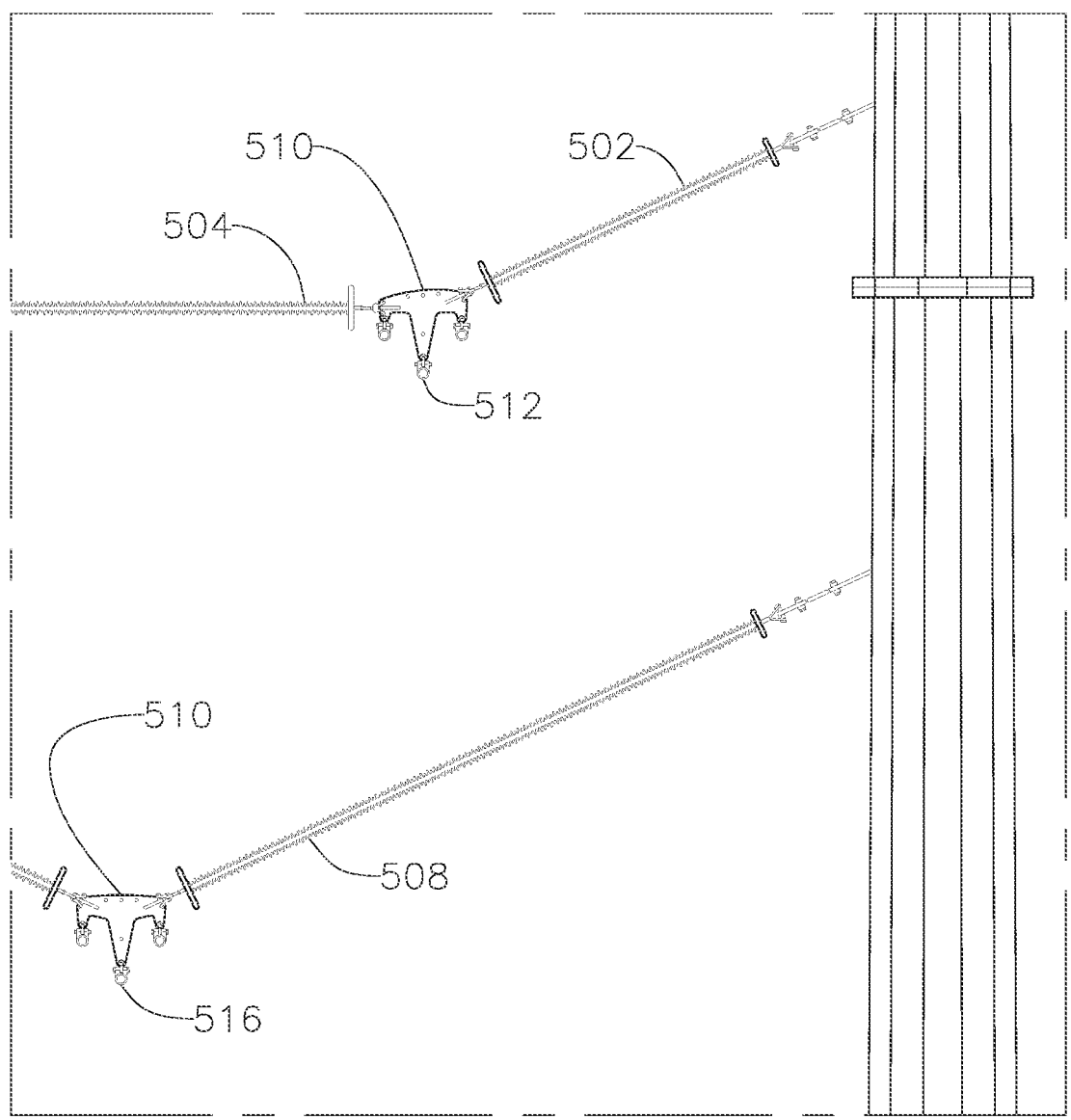
Figure 7A:
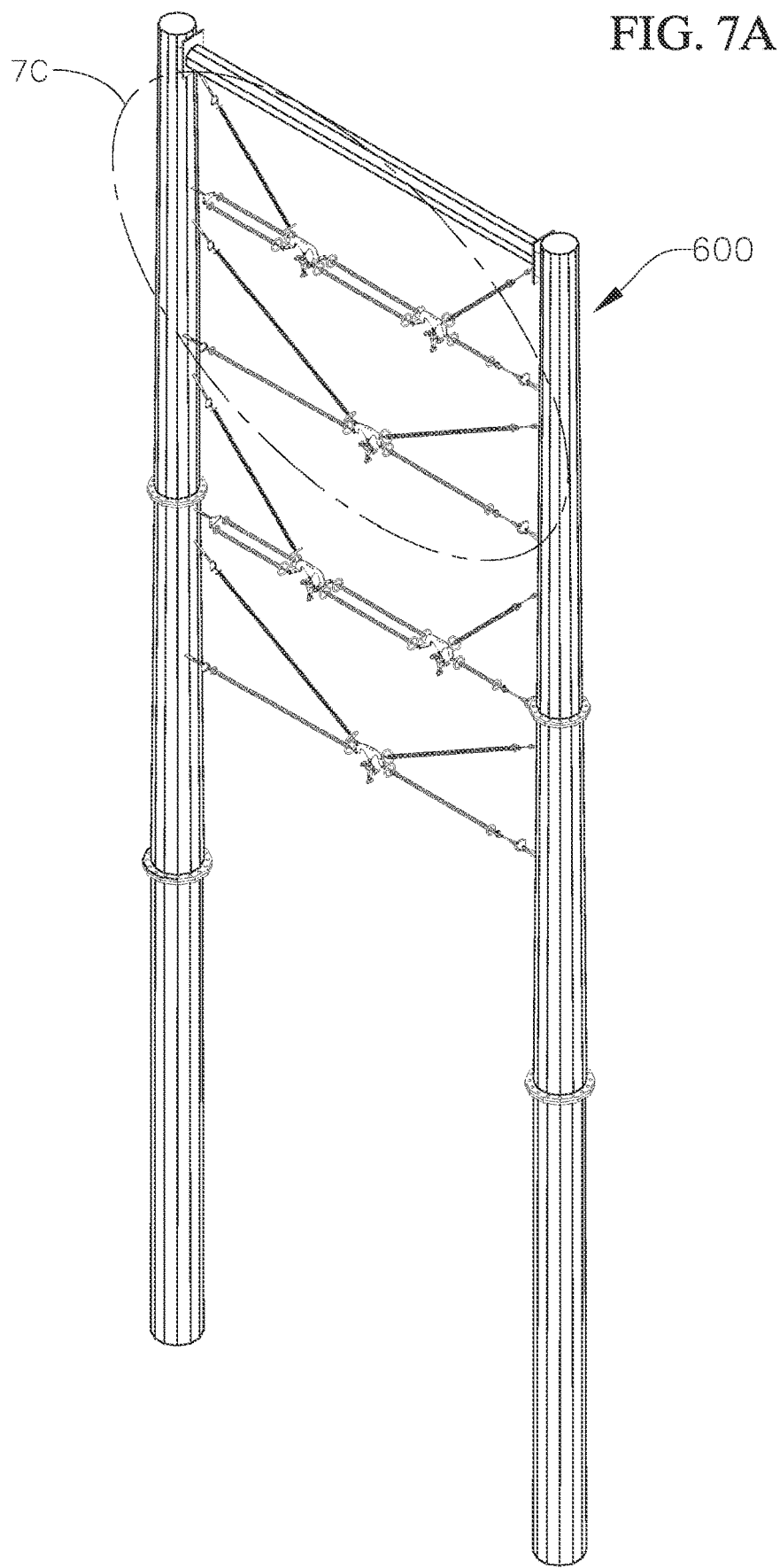
FIGS. 7A and 7B are a perspective view and a front view, respectively, of a transmission line post assembly according to one or more embodiments of the present disclosure.
Figure 7B:
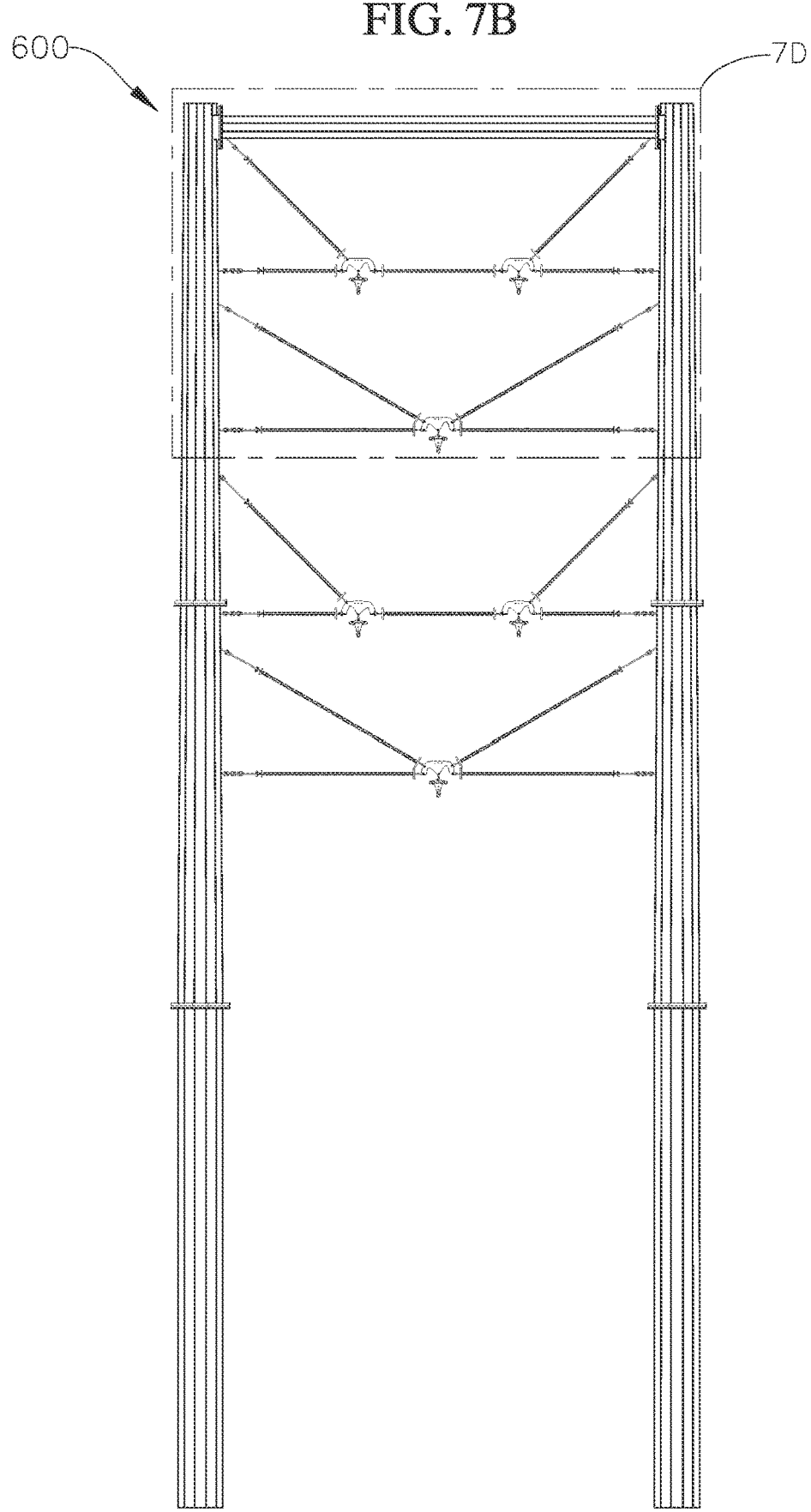
Figure 7C:
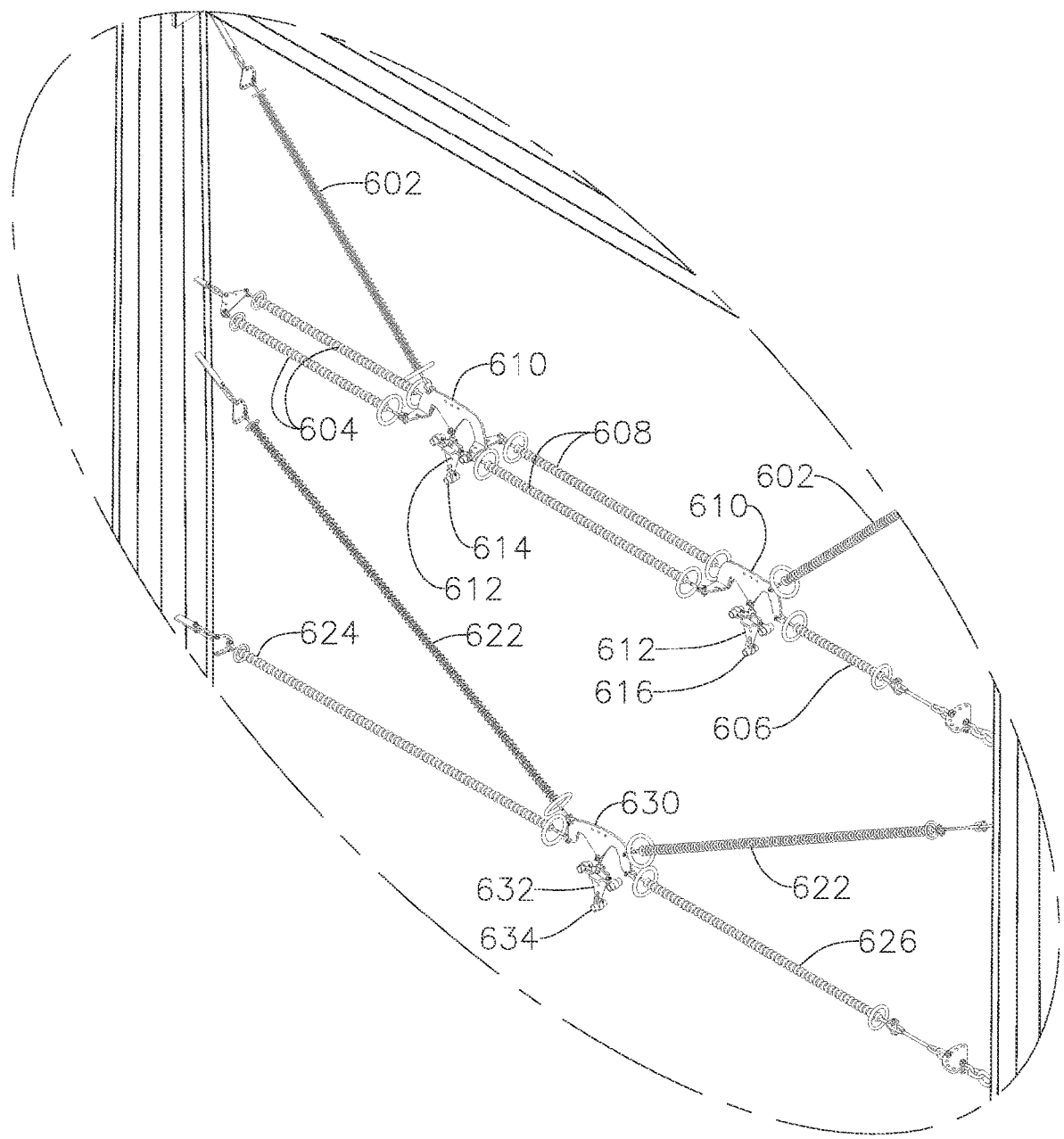
FIGS. 7C and 7D are enlarged views of regions "7C" and "7D" of FIGS. 7A and 7B, respectively.
Figure 7D:
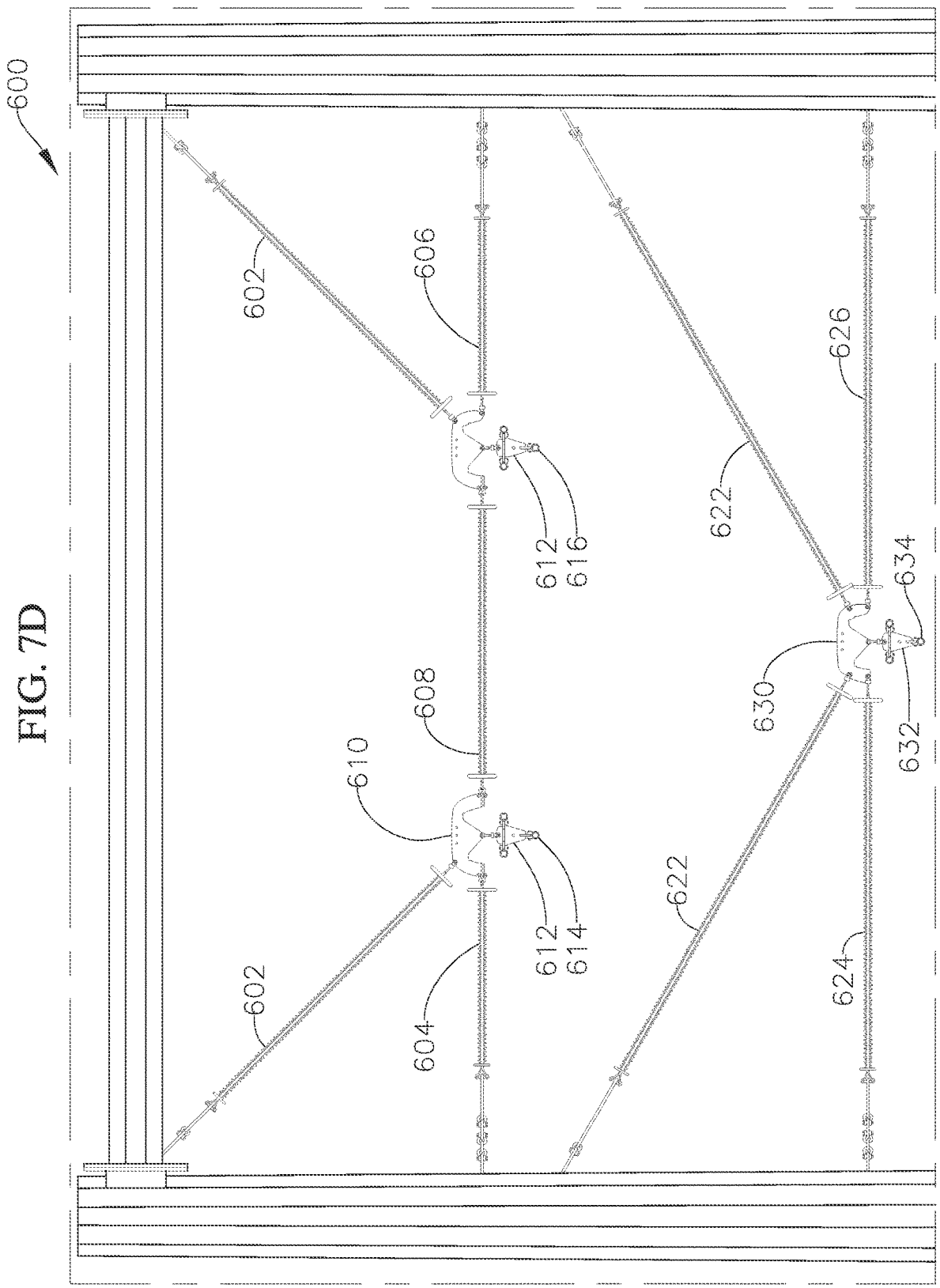

Referring to FIGS. 5B and 5E, in one or more embodiments, the first post insulator and the second post insulator each include a notch at a lower end (e.g., a hot end) of the corresponding post insulator. The notch may accommodate a sling (e.g., a 2 inch sling) and be adjacent to a pin connecting the first post insulator and the second post insulator to each other.

In one or more embodiments, the method of performing live-line maintenance further includes attaching a first tension member including a sling to the notch of the first post insulator, and attaching a second tension member including a sling to the notch of the second post insulator. The first tension member and the second tension member may be angled to support the weight of the pair of post insulators when the pair of post insulators are disconnected from each other. The tension members may be stretched, pulled, or supported by any suitable mechanism such that the tension members support the weight of the attached one of the pair of post insulators. Accordingly, in one or more embodiments, the method of performing live-line maintenance further includes disconnecting the pair of post insulators from each other by, for example, pulling a pin connecting the pair of post insulators to each other.

Referring to FIG. 5C, a method of performing live-line maintenance further includes connecting the first post insulator to, for example, a hoist via the first tension member. The hoist may hold the first post insulator in place by maintaining tension on the first tension member. In one or more embodiments, the hoist may be attached to a bracket of a cross arm extension (as shown in the embodiment of FIG. 5C) or a first cross arm.

In one or more embodiments, the method of performing live-line maintenance further includes connecting the second post insulator to, for example, a first rope and pully system via the second tension member. In this case, the second tension member may be a hand line and the hand line may be used to swing the second post insulator to a near vertical position.

Referring to FIG. 5D, in one or more embodiments, the method of performing live-line maintenance further includes connecting the second post insulator to, for example, a second rope and pully system via a third tension member. The third tension member may be connected to an end (e.g., a cold end) of the second post insulator opposite to the end including the notch. In this case, the third tension member may be a hand line and the hand line may be used to support the weight of the second post insulator.

The method of performing live-line maintenance further includes disconnecting the second post insulator from the cross arm extension (as shown in the embodiment of FIG. 5C) or the first cross arm by, for example, disconnecting four bolts that connect the second post insulator to the cross arm extension. After fully disconnecting the second post insulator, the first rope and pully system and the second rope and pully system may be used to lower the second post insulator thereby removing the second post insulator from the transmission line post assembly for replacement purposes.

Although specific hoisting and pulling mechanisms are described with reference to FIGS. 5A-5E, the present disclosure is not limited thereto. For example, any suitable mechanism for supporting and/or manipulating components of the transmission line post assembly may be used.

FIGS. 6A to 6D show a transmission line assembly according to one or more embodiments.

According to an embodiment, a transmission line assembly 500 includes a first string comprising one or more first suspension insulators 502 including a first end configured to be coupled to a first pole, and a second end coupled to a first yoke plate 510 that supports a first phase conductor 512; one or more second suspension insulators 502 including a first end configured to be coupled to a second pole, and a second end coupled to a second yoke plate 510 that supports a second phase conductor 514; and one or more third suspension insulators 504 including a first end coupled to the first yoke plate 510, and a second end coupled to the second yoke plate 510; and a second string comprising: one or more fourth suspension insulators 508 including a first end configured to be coupled to the first pole, and a second end coupled to a third yoke plate 510 that supports a third phase conductor 516; and one or more fifth suspension insulators 508 including a first end configured to be coupled to the second pole, and a second end coupled to the third yoke plate 510. The first, second, and third yoke plates 510 are configured to respectively support the first phase conductor 512, the second phase conductor 514, and the third phase conductor 516 to have an inverted delta, or inverted triangular, configuration. In an embodiment, the first, second, and third yoke plates 510 may be configured the same or similarly as the yoke plate 118 described above.

FIGS. 7A to 7D show a transmission line assembly according to one or more embodiments.

According to an embodiment, a transmission line assembly 600 includes a first string comprising one or more first suspension insulators 604 including a first end configured to be coupled to a first pole, and a second end coupled to a first yoke plate 610, 612 that supports a first phase conductor 614; one or more second suspension insulators 606 including a first end configured to be coupled to a second pole, and a second end coupled to a second yoke plate 610, 612 that supports a second phase conductor 616; and one or more third suspension insulators 608 including a first end coupled to the first yoke plate 610, 612, and a second end coupled to the second yoke plate 610, 612; and a second string comprising: a fourth suspension insulator 622 including a first end configured to be coupled to the first pole, and a second end coupled to a third yoke plate 630, 632 that supports a third phase conductor 634; and a fifth suspension insulator 622 including a first end configured to be coupled to the second pole, and a second end coupled to the third yoke plate 630, 632. The first, second, and third yoke plates are configured to respectively support the first phase conductor 614, the second phase conductor 616, and the third phase conductor 634 to have an inverted delta, or inverted triangular, configuration. In an embodiment, the first, second, and third yoke plates 612, 632 may be configured the same or similarly as the yoke plate 118 described above. In an embodiment, the transmission line assembly 600 further includes a sixth suspension insulator 624 including a first end configured to be coupled to the first pole, and a second end coupled to the third yoke plate 630, 632; and a seventh suspension insulator 624 including a first end configured to be coupled to the second pole, and a second end coupled to the third yoke plate 630, 632. In an embodiment, the transmission line assembly 600 further includes an eighth suspension insulator 602 including a first end configured to be coupled to the first pole, and a second end coupled to the first yoke plate 610, 612; and a ninth suspension insulator 602 including a first end configured to be coupled to the second pole, and a second end coupled to the first yoke plate 610, 612.

Accordingly, as disclosed herein, embodiments of the present disclosure provide a compact transmission line post assembly including a reduced ROW and low-profile. Further, systems and methods of one or more embodiments of the present disclosure provide for live-line maintenance (e.g., replacing a post insulator of the transmission line post assembly).

In the drawings, the relative sizes of elements, layers, and regions may be exaggerated and/or simplified for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has, " "have, " and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

As used herein, the terms "substantially", "about", "approximately", and similar terms are used as terms of approximation and not as terms of degree, and are intended to account for the inherent deviations in measured or calculated values that would be recognized by those of ordinary skill in the art.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A transmission line assembly comprising:
    a first V-string comprising:
        a first post insulator including a first end configured to be coupled to a first cross arm of a circuit tower that extends in a first direction, and a second end coupled to a first yoke plate; and
        a second post insulator including a first end configured to be coupled to the first cross arm, and a second end coupled to the first yoke plate;
    a second V-string comprising:
        a third post insulator including a first end configured to be coupled to the first cross arm, and a second end coupled to a second yoke plate; and
        a fourth post insulator including a first end configured to be coupled to the first cross arm, and a second end coupled to a second yoke plate; and
    a suspension insulator extending in a second direction crossing the first direction, the suspension insulator including a first end configured to be coupled to the first cross arm and a second end coupled to a third yoke plate,
    wherein the first yoke plate, the second yoke plate, and the third yoke plate are configured to respectively support a first phase conductor, a second phase conductor, and a third phase conductor to have an inverted triangular configuration.

2. The transmission line assembly of claim 1, wherein the suspension insulator is between the second post insulator and the fourth post insulator.

3. The transmission line assembly of claim 1, further comprising a fifth post insulator extending in the first direction, the fifth post insulator including a first end configured to be coupled to the circuit tower, and a second end coupled to the third yoke plate.

4. The transmission line assembly of claim 1, wherein the first V-string and the second V-string are configured to be coupled to the first cross arm by a plurality of pivot members, the first V-string and the second V-string being configured to swing in a third direction perpendicular to the first direction.

5. The transmission line assembly of claim 1, wherein the first post insulator and the second post insulator are configured to pivot about a first pivot axis, and the third post insulator and the fourth post insulator are configured to pivot about a second pivot axis.

6. The transmission line assembly of claim 5, wherein the first pivot axis is not parallel to the second pivot axis.

7. The transmission line assembly of claim 1, further comprising:
    a Y-clevis ball and a Y-clevis socket assembly coupling the first yoke plate to the first V-string; and
    a Y-clevis ball and a Y-clevis socket assembly coupling the second yoke plate to the second V-string.

8. The transmission line assembly of claim 1, further comprising at least one of a clevis fastener, an extension bracket, or an anchor shackle configured to connect the first end of the suspension insulator to the first cross arm.

9. The transmission line assembly of claim 1, further comprising a first yoke maintenance plate connecting the first yoke plate to the first V-string, the first yoke maintenance plate including a connection region to connect to a hoisting mechanism to pull the first yoke maintenance plate in a direction substantially parallel to the first post insulator or the second post insulator.

10. The transmission line assembly of claim 1, further comprising a first phase conductor, a second phase conductor, and a third phase conductor respectively supported by the first yoke plate, the second yoke plate, and the third yoke plate to have an inverted triangular configuration.

11. The transmission line assembly of claim 10, wherein the first phase conductor, the second phase conductor, and the third phase conductor comprise 115 kV, 230 kV, 345 kV, or 500 kV three-phase transmission lines.

12. The transmission line assembly of claim 1, wherein the first phase conductor, the second phase conductor, and the third phase conductor are respectively clamped to the first yoke plate, the second yoke plate, and the third yoke plate so as to not be pivotable with respect thereto.

13. A transmission line assembly comprising:
   a first string comprising:
      a first suspension insulator including a first end configured to be coupled to a first pole, and a second end coupled to a first yoke plate;
      a second suspension insulator including a first end configured to be coupled to a second pole, and a second end coupled to a second yoke plate; and
      a third suspension insulator including a first end coupled to the first yoke plate, and a second end coupled to the second yoke plate; and
   a second string comprising:
      a fourth suspension insulator including a first end configured to be coupled to the first pole, and a second end coupled to a third yoke plate; and
      a fifth suspension insulator including a first end configured to be coupled to the second pole, and a second end coupled to the third yoke plate,
   wherein the first yoke plate, the second yoke plate, and the third yoke plate are configured to respectively support a first phase conductor, a second phase conductor, and a third phase conductor to have an inverted triangular configuration.

14. The transmission line assembly of claim 13, wherein the second string further comprises:
   a sixth suspension insulator including a first end configured to be coupled to the first pole, and a second end coupled to the third yoke plate; and
   a seventh suspension insulator including a first end configured to be coupled to the second pole, and a second end coupled to the third yoke plate.

15. The transmission line assembly of claim 13, wherein the first string further comprises:
   an eighth suspension insulator including a first end configured to be coupled to the first pole, and a second end coupled to the first yoke plate; and
   a ninth suspension insulator including a first end configured to be coupled to the second pole, and a second end coupled to the second yoke plate.

16. The transmission line assembly of claim 13, further comprising a first phase conductor, a second phase conductor, and a third phase conductor respectively supported by the first yoke plate, the second yoke plate, and the third yoke plate to have an inverted triangular configuration.

17. The transmission line assembly of claim 16, wherein the first phase conductor, the second phase conductor, and the third phase conductor comprise 115 kV, 230 kV, 345 kV, or 500 kV three-phase transmission lines.

18. The transmission line assembly of claim 13, wherein the first phase conductor, the second phase conductor, and the third phase conductor are respectively clamped to the first yoke plate, the second yoke plate, and the third yoke plate so as to not be pivotable with respect thereto.

* * * * *